United States Patent [19]
Hirakawa

[11] Patent Number: 5,963,941
[45] Date of Patent: Oct. 5, 1999

[54] INFORMATION COLLECTION SYSTEM CONNECTED TO A COMMUNICATION NETWORK FOR COLLECTING DESIRED INFORMATION IN A DESIRED FORM

[75] Inventor: Hideki Hirakawa, Yokohama, Japan

[73] Assignee: Kabushiki Kaisha Toshiba, Kawasaki, Japan

[*] Notice: This patent is subject to a terminal disclaimer.

[21] Appl. No.: 09/055,302

[22] Filed: Apr. 6, 1998

Related U.S. Application Data

[63] Continuation of application No. 08/808,442, Feb. 28, 1997, Pat. No. 5,787,423, which is a continuation of application No. 07/762,373, Sep. 19, 1991, Pat. No. 5,673,428.

[30] Foreign Application Priority Data

Sep. 19, 1990 [JP] Japan .................................. 2-247448

[51] Int. Cl.$^6$ ...................................................... G06F 17/30
[52] U.S. Cl. ...................................... 707/5; 707/6; 707/10
[58] Field of Search .................................. 707/5, 1–6, 10

[56] References Cited

U.S. PATENT DOCUMENTS 5,377,354  12/1994  Scannell et al. ............................. 707/1
5,673,428   9/1997  Hirakawa et al. .......................... 707/5

OTHER PUBLICATIONS

"Intelligent Information–sharing Systems," vol. 30 No. 5, pp. 390–402, Thomas W. Malone et al., May 1987.
Object Lens: A Spreadsheet for Cooperative Work; Kum–Yew Lai et al., ACM Transactions on Office Information Systems, vol. 6, No. 4, pp. 332–353, Oct. 1988.

Primary Examiner—Jack M. Choules
Assistant Examiner—Hosain T. Alam
Attorney, Agent, or Firm—Oblon, Spivak, McClelland, Maier & Neustadt, P.C.

[57] ABSTRACT

An information collection system comprises a user interface unit for executing input/output information with respect to a user, an external interface unit for exchanging various types of information with an external unit, a user model determination unit for preparing at least one of user information for discriminating information required by the user, user information for defining an information proposition method, and user information for defining an information modification method in accordance with information input from the user interface unit, an information drawing-out unit for drawing out and modifying information input from the external interface unit in accordance with the user information acquired from the user model determination unit, an information proposition processing unit for converting information acquired by the information drawing-out unit into a proposition form for the user in accordance with the information acquired from the user model determination unit, and a control unit for receiving information from the individual units mentioned above, and executing control of the individual units and information exchange therewith in accordance with the received information.

14 Claims, 23 Drawing Sheets

```
DETERMINATION OF SEARCH CONDITIONS

KEY WORD        : NATURAL LANGUAGE | VOICE RECOGNITION &
                  PROCESSING       | SYNTATIC ANALYSIS

CONTENTS
CONDITION       : RELATE TO ANALYSIS OF SENTENCE

EXTENSION         NATURAL                   NLP, QUESTION
OF              : LANGUAGE       ⟹         ANSWERING SYSTEM
KEY WORD          PROCESSING                MACHINE TRANSLATION

EXTENSION         SENTENCE ANALYSIS
OF              : ANALYZE SENTENCE
CONTENTS          ANALYZED SENTENCE
CONDITION
```

FIG. 8

PROPOSITION CONTENTS DETERMINATION

RANK 1 : TITLE, COMPANY, NAME

RANK 2 : SUMMARY, CLAIMS

RANK 3 : DRAWINGS

RANK 4 : DESCRIPTION OF THE INVENTION

F I G. 13

DETERMINATION OF PROPOSITION METHOD, DATA PROCEEDING AND DATA MODIFICATION

PERIOD : MONDAY 10:00 (ACCESS MONDAY 9:00)

PROPOSITION METHOD : EMAIL

ERASE TIMING : ONE WEEK AFTER PROPOSITION

DATA MODIFICATION : TRANSLATION TO ENGLISH   OUTPUT TO PAPER

F I G. 14

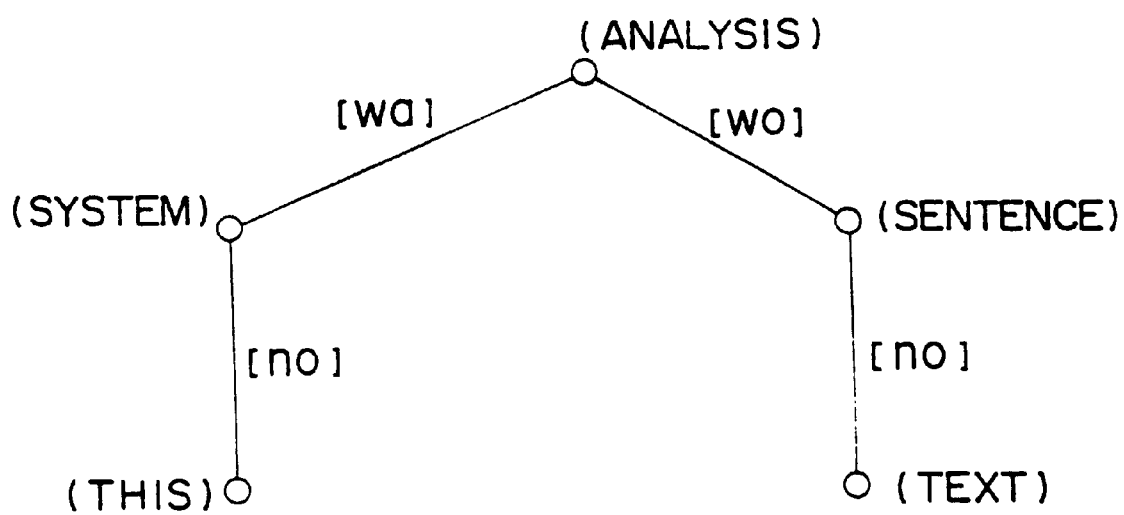
F I G. 17

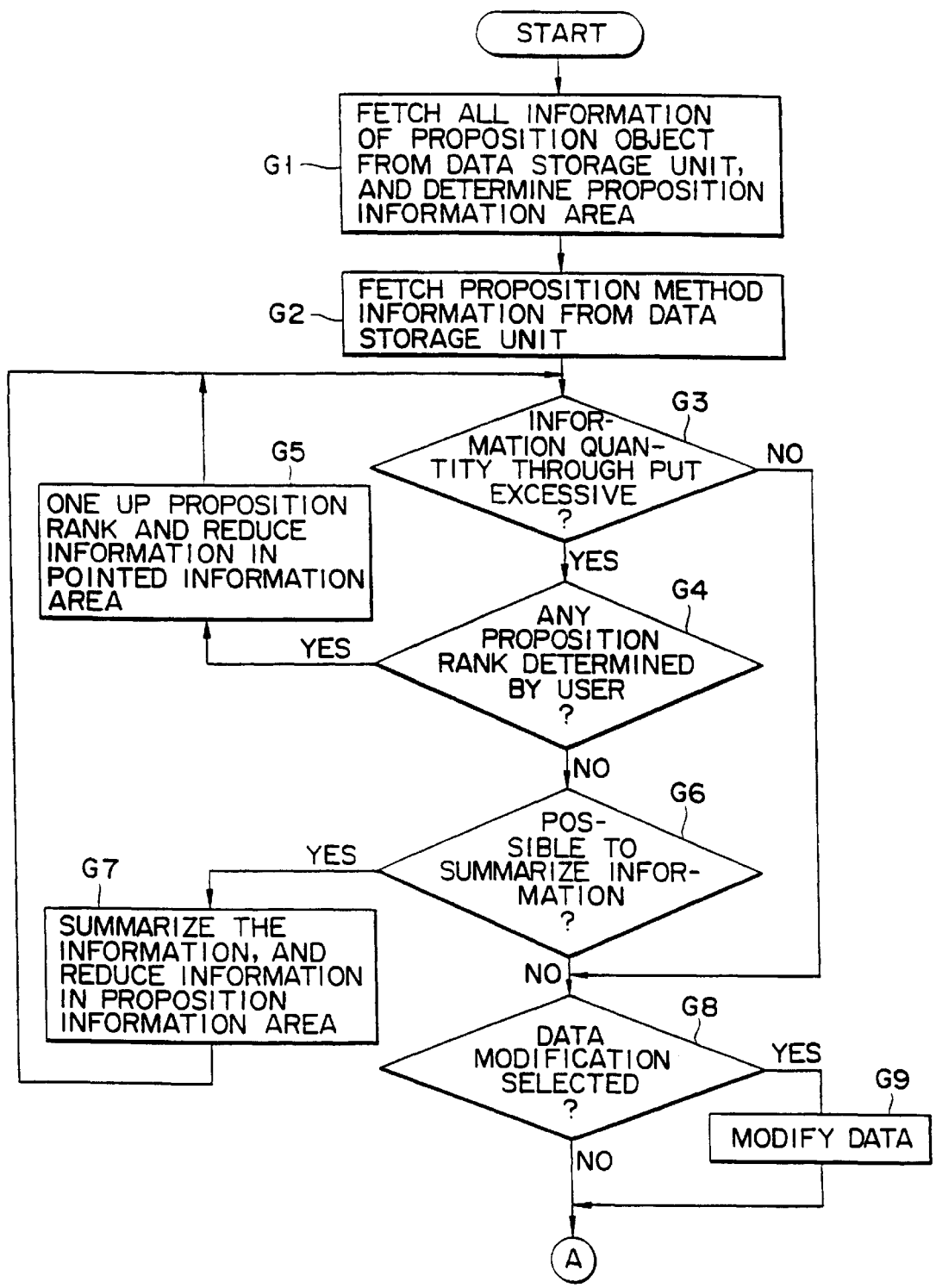
F I G. 18A

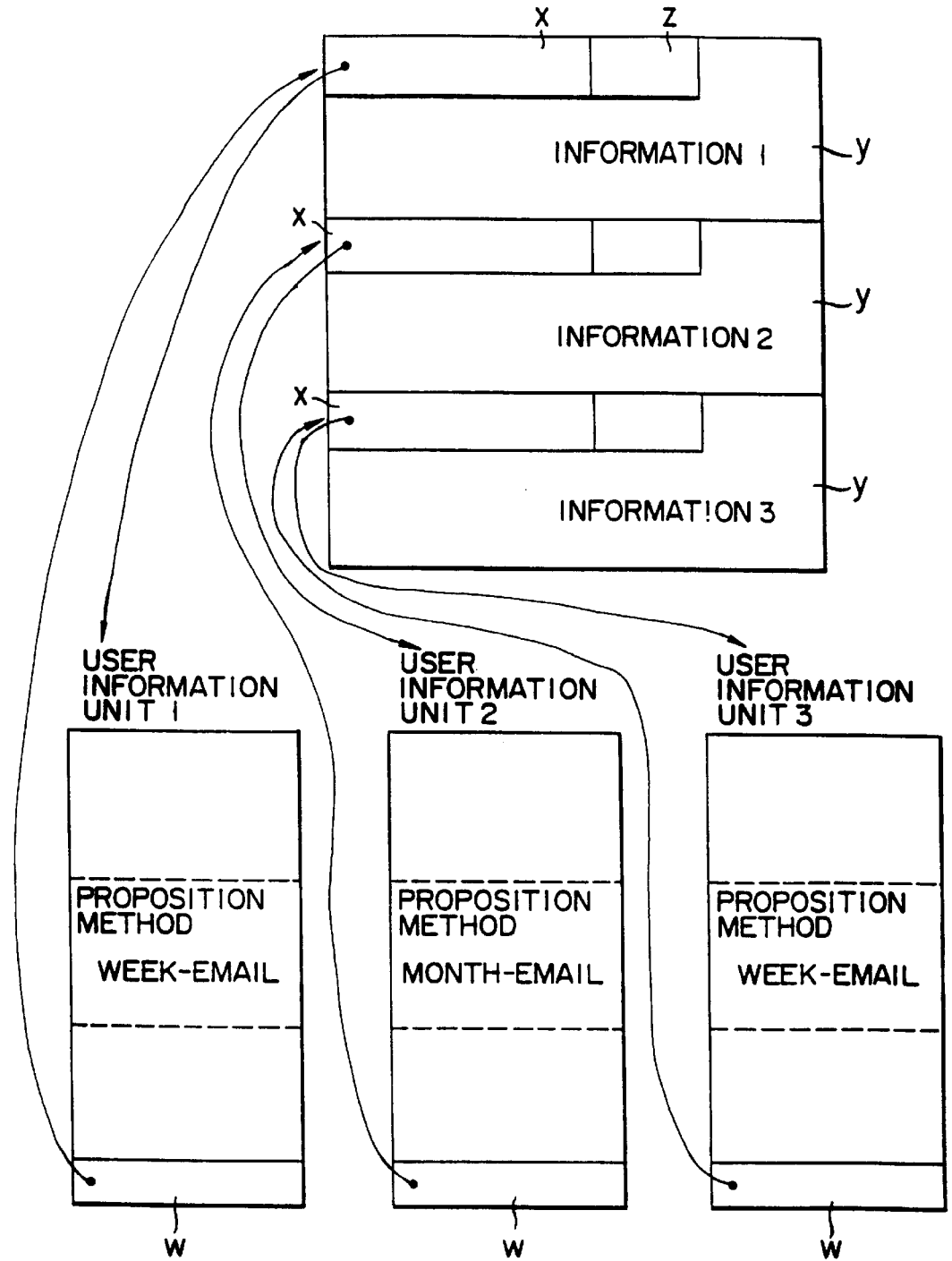
F I G. 19

```
WEEK-EMAIL

TIMING     : MONDAY   10:00

TOTAL
   AMOUNT    : A4 , 2P

METHOD    : EMAIL TO USER 1
```

F I G. 20A

```
MONTH-EMAIL

TIMING     : 1ST   10:00

TOTAL
   AMOUNT    : A4 ,  10P

METHOD    : EMAIL TO USER 1
```

F I G. 20B

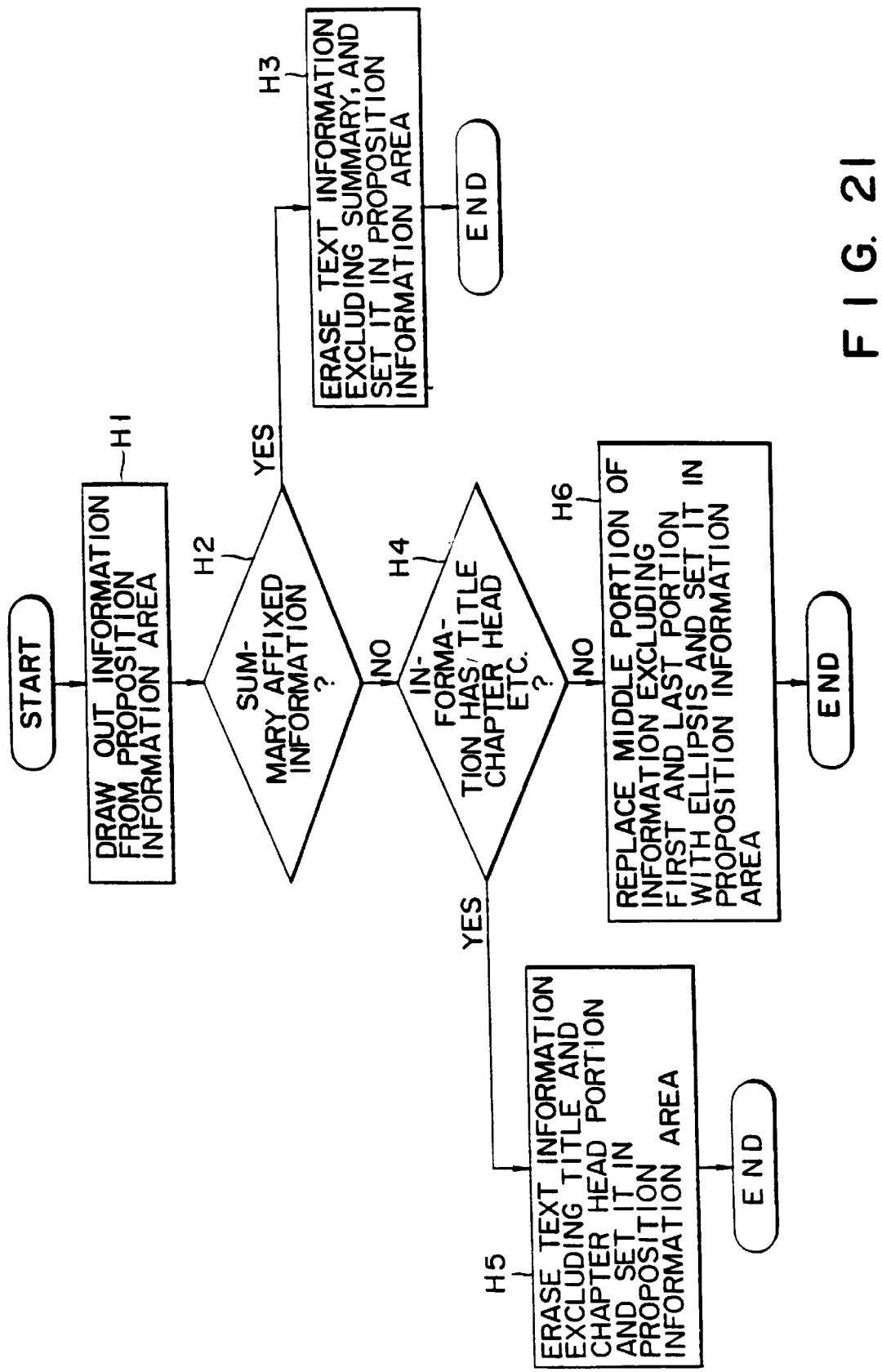
F I G. 21

```
┌─ USER INFORMATION UNIT #1 ─────────────────────────┐
│                                                     │
│  SEARCH       : JAPAN PATENT DATABASE               │
│  OBJECT                                             │
│  SEARCH       : KEY WORD CONDITION:                 │
│  CONDITION      NATURAL LANGUAGE PROCESSING |       │
│                             VOICE RECOGNITION &     │
│                             ANALYSIS SENTENCE       │
│                 CONTENT   : RELATE TO               │
│                 CONDITION   "ANALYSIS OF SENTENCE"  │
│  PROPOSITION  : RANK 1 : TITLE, COMPANY, NAME       │
│  CONTENTS       RANK 2 : SUMMARY                    │
│                 RANK 3 : TEXT                       │
│  PROPOSITION  : METHOD : WEEK-EMAIL                 │
│  METHOD                                             │
│  DATA         :                                     │
│  PROCEEDING                                         │
│  DATA         :                                     │
│  MODIFICATION                                       │
└─────────────────────────────────────────────────────┘
```

F I G. 22A

```
┌─ USER INFORMATION UNIT #2 ─────────────────────────┐
│                                                     │
│  SEARCH       : TELEX                               │
│  OBJECT                                             │
│  SEARCH       : KEY WORD CONDITION : PUBLIC WORKS   │
│  CONDITION                                          │
│                 CONTENT   :                         │
│                 CONDITION                           │
│  PROPOSITION  :                                     │
│  CONTENTS                                           │
│  PROPOSITION  : METHOD : WEEK-EMAIL                 │
│  METHOD                                             │
│  DATA         :                                     │
│  PROCEEDING                                         │
│  DATA         :                                     │
│  MODIFICATION                                       │
└─────────────────────────────────────────────────────┘
```

F I G. 22B

| | |
|---|---|
| PATENT A | |
| TITLE : | VOICE RECOGNITION DEVICE |
| APPLICANT : | A COMPANY |
| INVENTOR : | MR. A |
| SUMMARY : | IMPROVE PERCENTAGE OF RECOGNITION BY COUPLING THE SYNTACTIC ANALYZING PROCESS TO VOICE RECOGNITION DEVICE |
| TEXT : | oooooo oooooo ···· SYNTACTIC ANALYZING PROCESS ····· |
| KEY WORD : | VOICE RECOGNITION, SYNTACTIC ANALYZING |
| PATENT B | |
| TITLE : | LANGUAGE ANALYZING DEVICE |
| APPLICANT : | B COMPANY |
| INVENTOR : | MR. M |
| SUMMARY : | SET PERFORMANCE OF LANGUAGE ANALYSIS ABOVE LEVEL 1 USING KNOWLEDGE BASE. |
| TEXT : | oooo oooo ···ANALYZE SENTENCE···· |
| KEY WORD : | MACHINE TRANSLATION |
| PATENT C | |
| TITLE : | KNOWLEDGE BASE SYSTEM |
| APPLICANT : | C COMPANY |
| INVENTOR : | MR. C |
| SUMMARY : | EFFICIENT WAY OF MANAGING CONSISTENCY OF KNOWLEDGE BASE |
| TEXT : | ooooo ooooo |
| KEY WORD : | KNOWLEDGE, ABC METHOD |

FIG. 23

TELEX A

LOCATION OF SENDER : D COUNTRY

SENDER : MR. D

TEXT : THE GOVERNMENT OF D COUNTRY APPROVED THE BUDGET BILL.... THE BUDGET FOR THE PUBLIC WORKS WAS INCREASED

TELEX B

LOCATION OF SENDER : E COUNTRY

SENDER : MR. E

TEXT : AN ENVIRONMENTAL CONFERENCE WAS HELD IN E COUNTRY....

FIG. 24

WEEK-MAIL

JAPAN PATENT DATABASE

1. VOICE RECOGNITION DEVICE
   A COMPANY, MR. A           % 105
   IMPROVE PERCENTAGE OF RECOGNITION
   BY COUPLING THE SYNTACTIC ANALYSIS
   PROCESS TO A VOICE RECOGNITION DEVICE.

2. LANGUAGE ANALYZING DEVICE
   B COMPANY  MR. B           % 109
   IMPROVE PERFORMANCE OF LANGUAGE
   ANALYSIS USING KNOWLEDGE BASE

TELEX

1. D COUNTRY, MR. D           % 15
   THE GOVERNMENT OF D COUNTRY APPROVED
   THE BUDGET BILL.
   ···THE BUDGET FOR THE PUBLIC WORKS
   WAS INCREASED.

FIG. 25

INFORMATION COLLECTION SYSTEM CONNECTED TO A COMMUNICATION NETWORK FOR COLLECTING DESIRED INFORMATION IN A DESIRED FORM

This application is a Continuation of application Ser. No. 08/808,442, filed on Feb. 28, 1997, now U.S. Pat. No. 5,787,423, which is a Continuation of application Ser. No. 07/762,373 filed Sep. 19, 1991, now U.S. Pat. No. 5,673,428.

BACKGROUND OF THE INVENTION

1. Field of the Invention

The present invention relates to an information collecting system capable of collecting (i.e., drawing out or extracting and processing) only that information among all the information available through an information network or the like which a user requests in a form desired by the user at a user-desired timing to thereby propose or output only the information requested by the user.

2. Description of the Related Art

Recently, as the information processing technology using an electronic computer and the technology for information communication via various communication networks are improved, multifarious data are accumulated as information and the accumulated information can be referred to from various locations. Recently, as a so-called personal computer communication system or electric mail service becomes popular, it is possible to acquire a vast amount of a very wide variety of information.

According to a conventional way of collecting information using a computer, a user accesses a database using a command language (e.g., key-word searching etc.) to extract the desired information from the database. The format of information present in an information source, such as a database, and the amount of information what is desired by the user. It is therefore considerably difficult to extract only the desired information for information collection. Unless the user accesses the information source, the user cannot acquire deadlock detection information therefrom. When the user neglects accessing the information source, he is likely to undesirably overlook useful information present in the information source. When the user constantly accesses every available information source to obtain information, the desired information is easily buried in a huge amount of multifarious information accessible from the information sources. This conventional method easily causes the user to overlook the desired information.

As described above, conventionally, every time a user wants to collect information, the user should access available information sources. Further, when the user neglects accessing information, the user may easily overlook useful information if such exists. Of all the information accumulated in a database or the like designed for non-individual, there is often very little information a user wants. The conventional information collection therefore undesirably requires tedious works of:

1) screening or filtering excess information from what is obtainable from an information source, and 2) extracting only the desired information from the available information and processing it.

SUMMARY OF THE INVENTION

An object of the present invention is to provide an information collection system, which always monitors information available through a computer network or the like, and, upon finding information preset and requested by a user, can accurately collect only that user-requested information by subjecting the information to processing, such as summarizing or drawing out, and proposing the processed information in a form and quantity desired by the user at a user-desired timing.

An information collection system according to the present invention comprises:

a user interface unit for executing input/output information with respect to a user;

an external interface unit for exchanging various types of information with an external unit;

a user model determination unit for preparing at least one of user information for discriminating information required by the user, user information for defining an information proposition method, and user information for defining an information modification method in accordance with information input from the user interface unit;

an information drawing-out unit for drawing out and modifying information input from the external interface unit in accordance with the user information acquired from the user model determination unit;

an information proposition processing unit for converting information acquired by the information drawing-out unit into a proposition form for the user in accordance with the information acquired from the user model determination unit; and a control unit for receiving information from the individual units mentioned above, and executing control of the individual units and information exchange therewith in accordance with the received information.

This information collection system is characterized in that the information proposition processing unit includes a function to integrate multiple pieces of information acquired through the external interface unit respectively from multiple different information sources and converting the integrated information into a proposing form for a user, and a function to change a proposition method for information acquired through the external interface unit and a proposing amount of the information in accordance with an elapsing time from an input time of the information or an amount of information drawn out and modified by the information drawing-out unit.

In addition, this system is characterized in that the control unit includes means for accessing an external database via the external interface unit in accordance with the user information proposed by the user model determination unit, and a function to propose and output the information converted by the information proposition processing unit through the user interface unit at a timing determined in accordance with the user information proposed by the user model determination unit.

According to the information collection system embodying the present invention, first, a user invokes the user model determination unit while interacting with the system through the user interface unit. Then, the user causes the user model determination unit to prepare user information including, a condition concerning the desired information, an information proposition method, modifications to be added to the desired information, and the like. Finally, the user stores the prepared user information into the data storage unit, or corrects the user information already determined by the user model determination unit.

The control unit properly accesses the information source specified in advance in accordance with the user information by the user. The control unit properly fetches information flowing in an external network via the external interface unit, and gives the fetched information to the information drawing-out unit. The information drawing-out unit analyzes the information and determines whether it is necessary or unnecessary in accordance with the user information. If the fetched information is the desired one, the information drawing-out unit performs user-desired processing, such as data modification, and accumulates the resultant information into the data storage unit.

Thereafter, the control unit invokes the information proposition processing unit whenever needed based on the user information. The information proposition processing unit performs integration or conversion of various types of information obtained by the information drawing-out unit in accordance with the user information, when needed. The control unit proposes the integrated or converted information from the information proposition processing unit to the user via the user interface unit.

The thus structured information collection system embodying the present invention can permit a user to properly acquire only the desired information among a vast amount of multifarious information in the desired proposition form, thereby ensuring easy and timely information collection without overlooking information.

The information collection system according to the present invention performs the following operations:

1) Permit a user to enter an information source from which information is to be collected, a condition concerning the desired information, a proposition method for that information, modifications to be added to the information, and the like.
2) Automatically accesses information via the external interface unit or monitors automatically-receiving information, and selects only the user-desired information among the accessed or received information to thereby collect the information.
3) Modifies the information collected by the user, if necessary.

According to the present system, therefore, the necessary information can be proposed and output in the user-requested form. This produces practically significant effects including:

1) The information collection can be executed efficiently and without overlooking any information.
2) Accurate information collection can be conducted effectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 8 is a diagram showing a screen for determining search conditions;

FIG. 13 is a diagram showing a screen for determining proposition contents;

FIG. 14 is a diagram of a screen to determine a proposition method, a data processing and a data modification;

FIG. 17 is a diagram illustrating a semantic structure of a sample sentence;

FIGS. 18A and 18B are flowcharts showing the operation of the information draw-out unit;

FIG. 19 is a diagram exemplifying the relation between information stored in a data storage unit and the user information units;

FIGS. 20A and 20B are diagrams of sample data generally defined as a proposition method;

FIG. 21 is a flowchart showing a summarizing process;

FIGS. 22A and 22B are diagrams exemplifying the user information units;

FIG. 23 is a diagram illustrating an example of information acquired by patent database;

FIG. 24 is a diagram illustrating an example of information acquired by a telex line; and FIG. 25 is a diagram exemplifying the proposition contents of the system.

DETAILED DESCRIPTION OF THE PREFERRED EMBODIMENTS

An information collecting system according to one embodiment of the present invention will now be described referring to the accompanying drawings.

Figure 1:
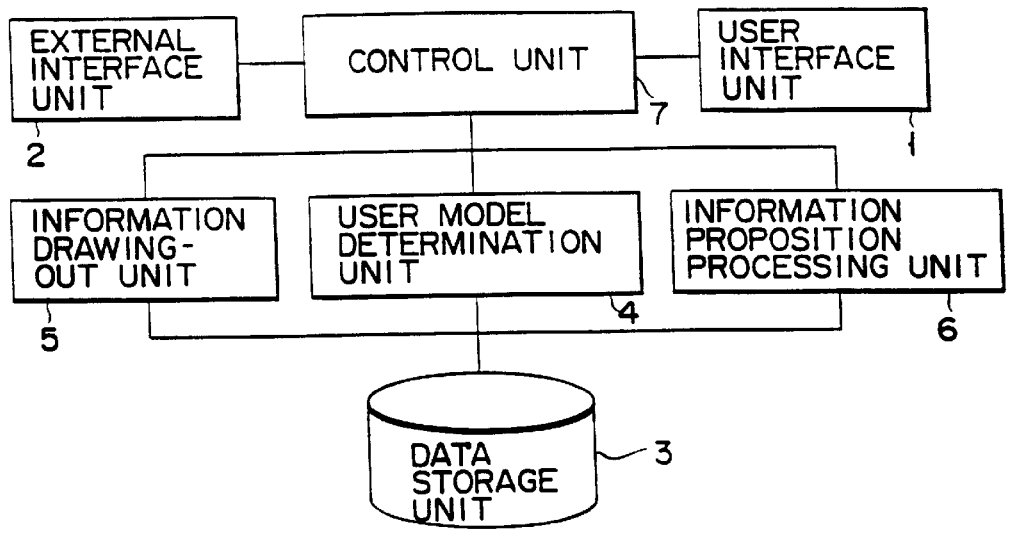
FIG. 1 is a diagram illustrating the general structure of an information collection system according to one embodiment of the present invention.

FIG. 1 illustrates the general schematic structure of the system according to this embodiment.

The system includes a user interface unit 1, an external interface unit 2, a data storage unit 3, a user model determination unit 4, an information drawing-out unit 5, an information proposition processing unit 6 and a control unit 7.

The user interface unit 1 including a keyboard and a mouse etc, has the function for receiving information sent from a user, displaying information and outputting (or printing) information on paper. The external interface unit 2 connected to an external database or a communication line performs transmission and reception of external data.

As an example of external information sources, a patent database and a telex information line will be described in the system of this embodiment. The two information sources are to be accessed through the external interface unit 2.

The data storage unit 3 stores, calls and corrects (updates) user information to be described later and information collected via the external interface unit 2, both necessary for the processing in this system. Through the interactive communication with the user via the user interface unit 1, the user model determination unit 4 determines the contents of processing to be added to information (for example, (1) user information for discriminating which information the user requires and which the user does not among received information, (2) user information needed to specify the form of information proposition to the user and the proposition timing, and (3) information requested from the outside of the system), and also prepares user information to specify how to process the contents of the processing. Based on the user information prepared by the user model determination unit 4, the information drawing-out unit 5 discriminates, draws out and modifies various information obtained via the external interface unit 2. The information proposition processing unit 6 arranges, integrates and edits various information having undergone the discrimination, drawing-out, modification, etc. in the information drawing-out unit 5, in accordance with the user information. The processed information is then proposed to the user via the user interface unit 1. The control unit 7 controls the above-described individual units.

The functions of the individual units in this system will now be explained in detail.

Figure 2:
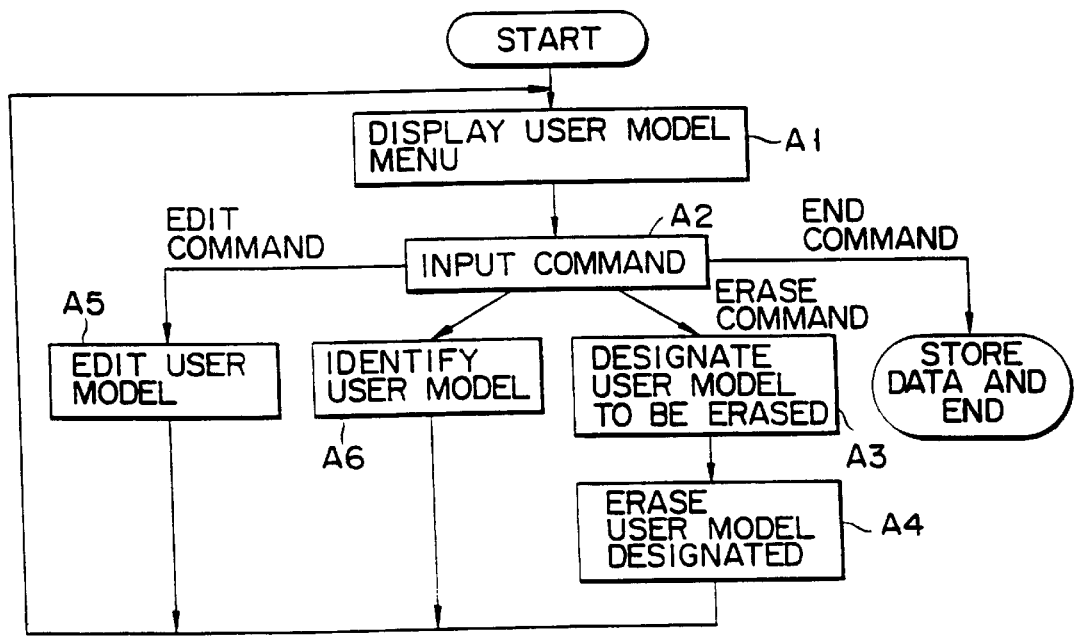
FIG. 2 is a flowchart showing the operation of a user model determination unit.

FIG. 2 shows the general operation of the user model determination unit 4. The user model determination unit 4 interactively communicates with the user via the user interface unit 1 and prepares user information, identifies the user information with that in the data storage unit 3, and erases and edits existing user information stored in the data storage unit 3.

The specific processing of the user model determination unit 4 to determine a user model will be described below.

The user model determination unit 4 searches user information previously stored in the data storage unit 3 and displays the searched user information via the user interface unit 1 (step A1). The user model determination unit 4 receives a command from the user to the displayed information, and analyzes it (step A2). In the case of receiving an [END] command from the user in step A2, the user model determination unit 4 follows that command, and stores user information unit (to be described later) at the time of reception of the command, and terminates the processing.

The user can also select three other commands, [ERASE], [EDIT] and [IDENTIFY] in step A2.

When receiving the [ERASE] command from the user interface unit 1, the user model determination unit 4 assigns user information unit (or a user model) to be erased via the user interface unit 1 (step A3), and erases that user information unit (step A4). After the user information is erased in step A4, the user model determination unit 4 does not collect information about the contents of the erased information.

If the user has input the [EDIT] command, the user model determination unit 4 performs a user model edit processing to the user information unit (step A5). When the [IDENTIFY] command is input, the user model determination unit 4 performs a user model identification processing (step A6).

The user information unit defines a group of various user information. If the user sets the user information unit in his preferable form, he can obtain the necessary information in the desired form and at the desired timing. The data storage unit 3 in the system according to this embodiment can store multiple user information units.

Figure 3:
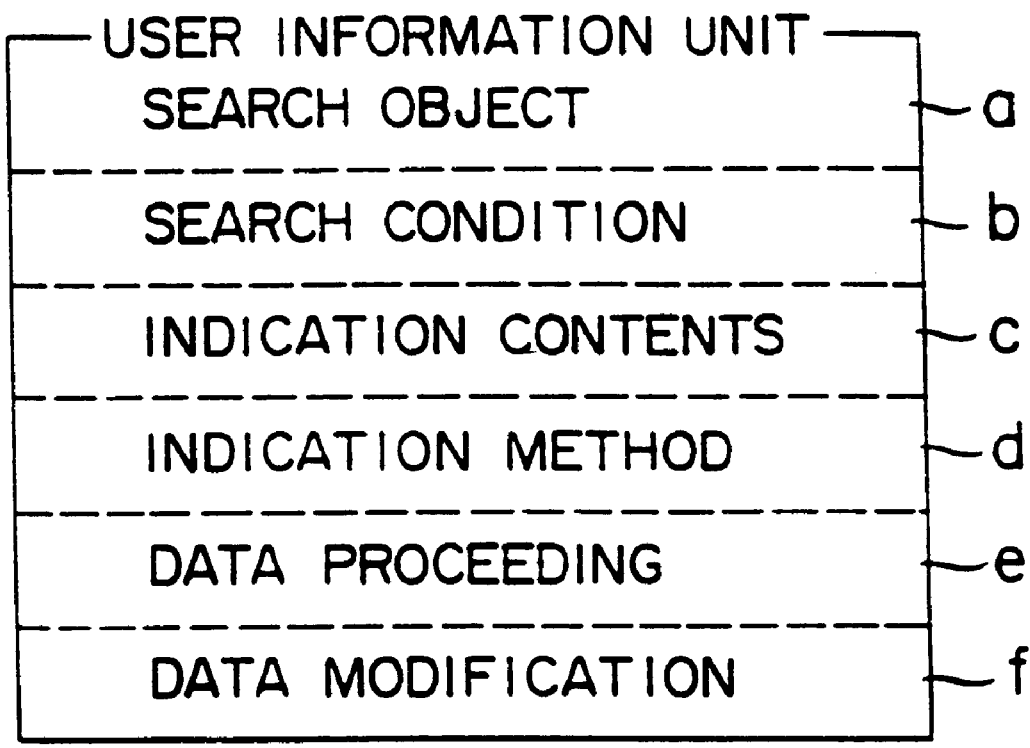
FIG. 3 is a diagram illustrating the contents of a user information unit.

FIG. 3 shows an example of the items that the user information unit has. Information of the individual items is basically set by the user interface unit 1 in the user model identification processing (step A6).

A search object a is user information for specifying an information source from which information is to be collected. Based on user information indicated by the search object a, information sources (such as database, information, information base station and news, all accessible via the external interface unit 2 of the system) are set to the individual user information units. Multiple information sources can be set in a single user information unit. It is possible to assign, for example, multiple information sources, such as A newspaper and B newspaper, or assign an information group (which includes multiple information sources, for example, the A newspaper and B newspaper, in the case of assigning newspapers). A search condition b defines user information to discriminate information the user desires from unnecessary information. According to the search condition b, a matching process is performed between various information supplied from the information sources and the user-requesting information.

Indication contents c are user information for determining which part of information (one part or the entire part) acquired through the matching process to be described later should be proposed to the user. An indication method d is user information of when and in what form the acquired information should be proposed to the user. A data proceeding e is used to determine how the acquired information is to be saved or erased. A data modification f indicates a method for modification when the information should be modified.

Figure 4:
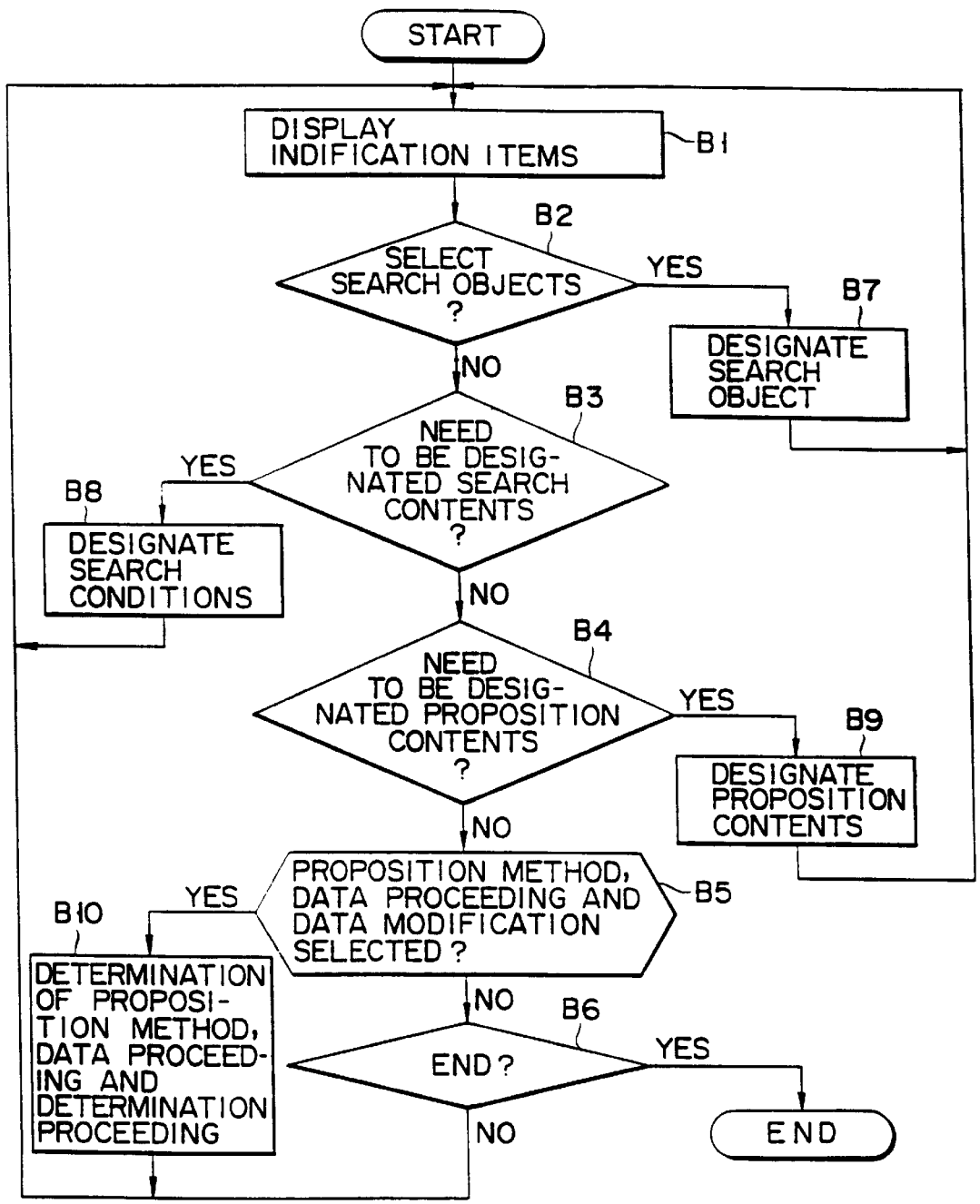
FIG. 4 is a flowchart representing identification processing done by the user information unit.

FIG. 4 illustrates an identification processing conducted by the user model determination unit 4 to set the user information shown in FIG. 3.

Figure 5:
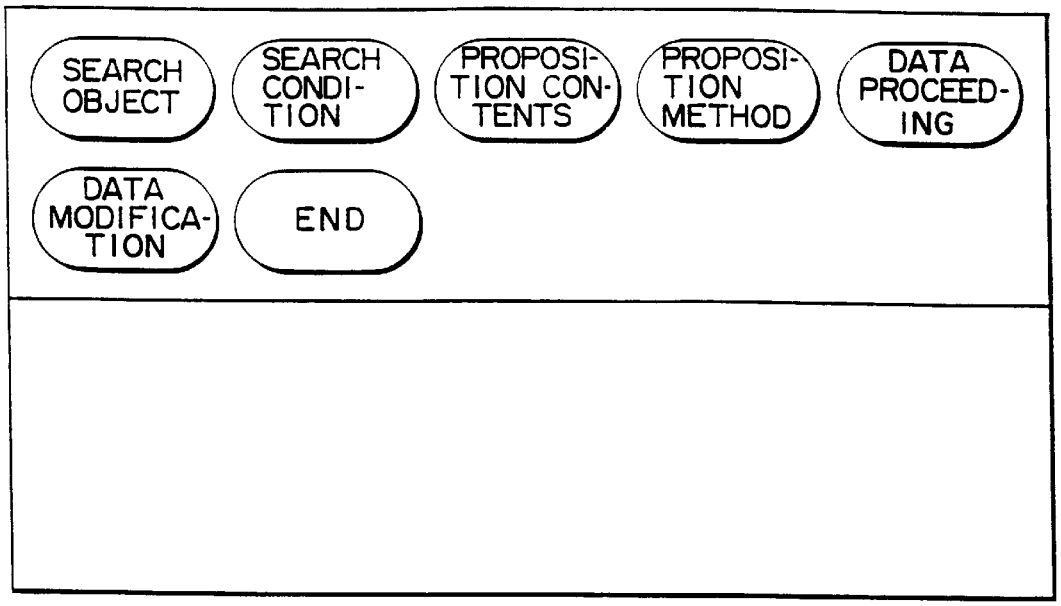
FIG. 5 is a diagram illustrating a screen menu for identification of user information unit.

The processing flow shown in FIG. 4 will now be described. First, information of an item to be identified by the user interface unit 1 is proposed to the user, for example, on a user screen as shown in FIG. 5 (step B1). The user selects one of seven icons (selection buttons) on the user screen, for example, so that he can instruct execution of the process indicated by that icon. Which icon is selected is determined and detected in an input determination processing (steps B2 to B6).

Figure 6:
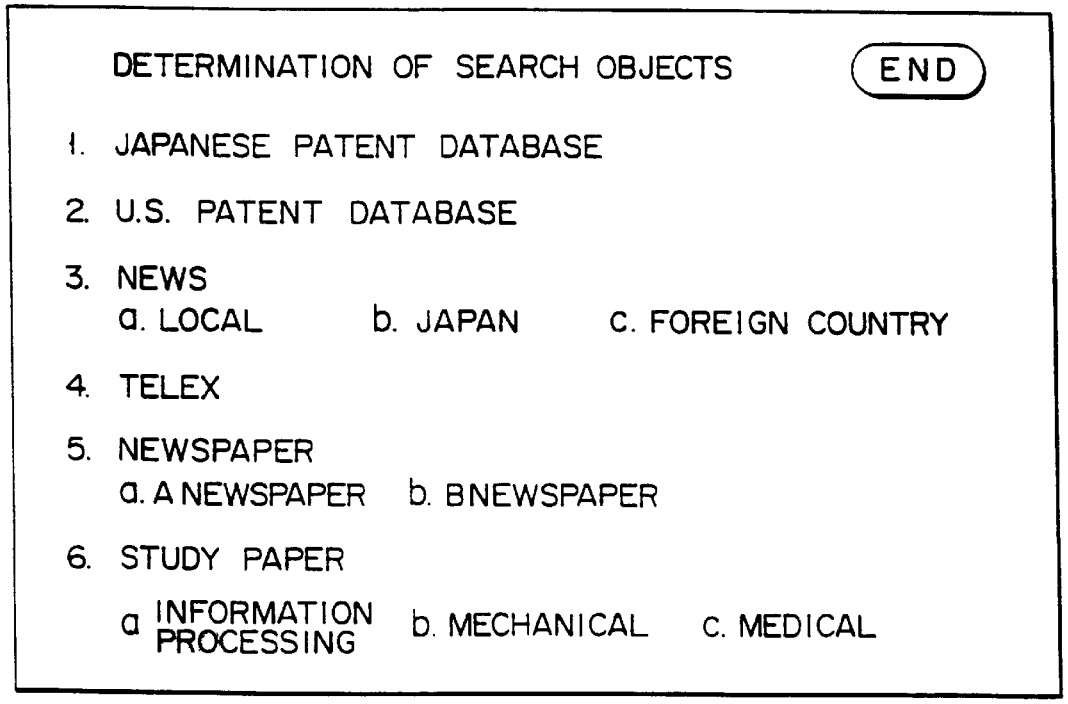
FIG. 6 is a diagram showing a screen to determine an information source as a search object.

When the user selects the [SEARCH OBJECT], the determination of search objects is performed in step B7 through the input determination processing (step B2). In step B7, an information source already identified in the system is proposed to the user via the user interface unit 1, by the display shown in FIG. 6, for example. Information of the information source as shown in FIG. 6 is prestored in the data storage unit 3 as having the data structure shown in FIG. 7, for example.

Information of information sources stored in the data storage unit 3 is expressed as a data structure having various information sources designed in a hierarchical tree structure. Leaf portions of the tree-structured data each correspond to various information sources accessible through the external interface unit 2. Branch portions of the tree-structured data are each a group of information, and each correspond to several information sources or information groups grouped together. Items reflecting the above tree structure are displayed on a screen for the aforementioned determination of search objects shown in FIG. 6. It is possible to determine a search object while displaying more detailed portions as needed. A user may designate an information group to specify multiple information sources included in that information group at a time.

A data storage area, which is specified by a leaf portion of the tree-structured data, is an area to hold various information corresponding to each information source. In this area the names of information sources, the types of the information sources (e.g., the types of various databases, and the types of information input lines), and methods of accessing the information sources (e.g., addresses, communication protocols, interactive protocols, etc.) are described. The information of any information source accessible through the external interface unit 2 can be acquired by referring to table information (i.e., the data storage area) which has a data structure with the mentioned area. As a result, the user can easily and efficiently collect information from available information sources. The user selects only the necessary information source as a search object on the screen for the determination of search objects shown in FIG. 6, and selects the [END] button after the selection of the information source, terminating the determination of search objects. The information source specified by the determination of search objects is stored in the data area for a search object a shown in FIG. 3. For instance, when the user selects two information sources, "Japanese patent database" and "telex", the contents of the table information of the two information sources are stored in the data area for the search object a, and the proposition screen for the user returns to the initial screen shown in FIG. 5. When the user selects "newspaper", the contents of the table information of both information sources, A newspaper and B newspaper, which are a collection of newspaper information sources, are set in the data area for the search object a.

When the user selects [SEARCH CONDITION], the user's instruction is detected in the input discrimination process (step B3) and the search condition is determined (step B8). In the determination of search conditions, of the information source to be searched for (specifically, information to be obtained from "Japanese patent database" and "telex" determined above), user information for discriminating the information desired by the user from unnecessary information is determined. In the determination of search conditions in the system according to this embodiment, the search condition is specified and determined by two parameters, for example, a key word and a contents condition.

The determination of search conditions is performed by proposing a screen for the determination of search conditions as shown in FIG. 8 to the user. FIG. 8 exemplifies the case where the user has selected the search condition concerning a key word in the description of "natural language processing|voice recognition & syntactic analysis". The symbol "|" in the description of the search condition indicates an OR condition, while "&" means an AND condition. In the example shown in FIG. 8, therefore, two kinds of information are selected as search conditions: information with a key word, "natural language processing", or (OR) information having two key words, "voice recognition" and (AND) "syntactic analysis". Extension of keywords and extension of the contents condition in FIG. 8 will be described later.

The determination of search conditions with a group of keywords being formed from the individual key words determined above, the determination of search conditions is executed using that group as the object of matching which will be described later.

Figure 9:
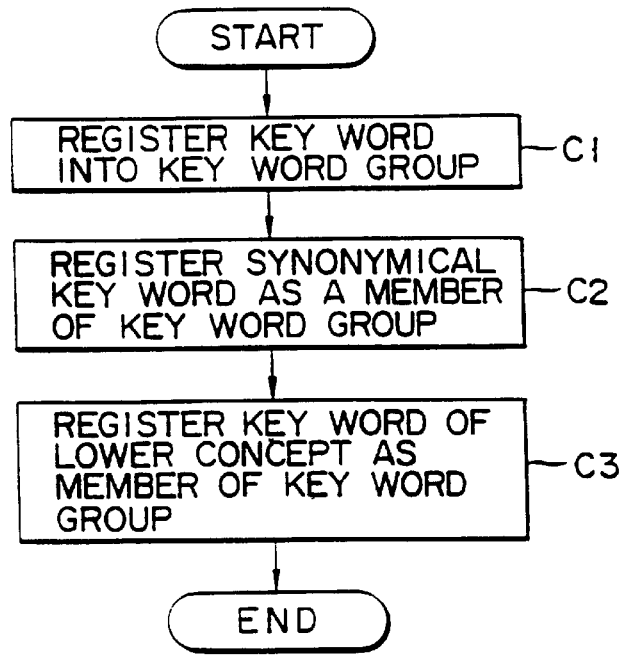
FIG. 9 is a flowchart for acquiring a key word group from a single key word.

FIG. 9 shows the process for producing the key word group from the individual key words. The process is performed in following steps. A key word selected by a user is identified as an element of the key word group (step C1). The key word selected by the user and a key word synonymical to it are identified as elements of the key word group in the search condition portion of the user information unit (step C2). A key word of lower concept than the above-described keywords, and a synonymical key word are identified in the key word group (step C3).

Figure 10:
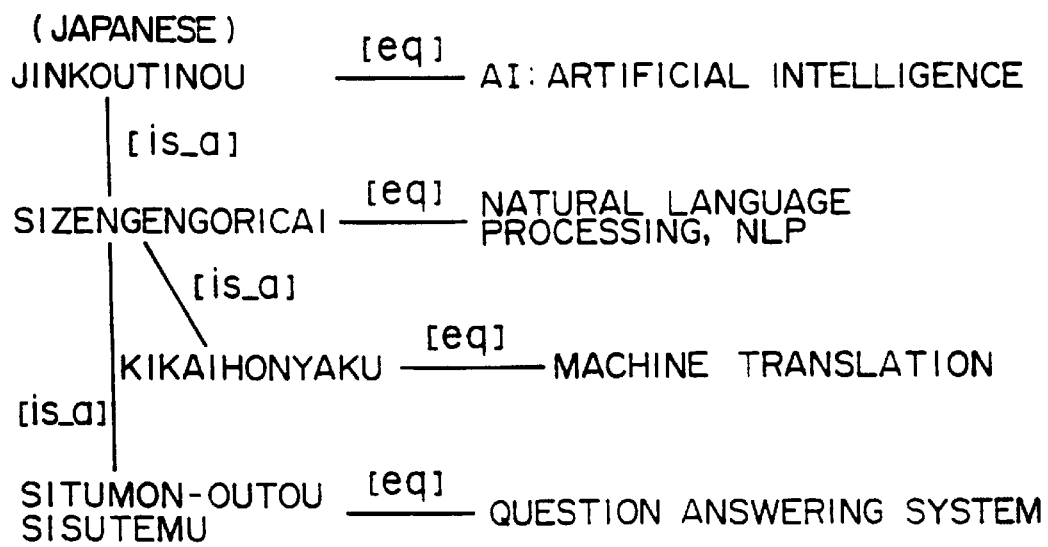
FIG. 10 is a diagram exemplifying a key word thesaurus.

The key word synonymical to the selected key word, and the key word of lower concept, which have been identified in the steps shown in FIG. 9, are stored in the data storage unit 3. The key words stored in the data storage unit 3 can be obtained referring to a word thesaurus as shown in FIG. 10. The word thesaurus indicates synonymical relationship between words by [eq], and describes the relationship between words by linking the upper and lower concepts of the words with [is-a].

In an example as illustrated in FIG. 10, [sizengengosyori (Japanese)] is linked to [natural language processing] with [eq]. In step C2 in FIG. 9, therefore, "natural language processing" is identified in the key word group. Then, its synonymical key word and a key word of lower concept are acquired and identified in the key word group; for example, "kikaihonyaku (Japanese)" as "machine translation", and further "shitumon-outou sisutemu (Japanese)" as "question answering system", respectively, are identified in the key word group. In this manner, the key word selected by the user and a logical expression of key words originated from the selected key word are determined in the key word items.

The key word specified by the user and key words originated from that key word are displayed as extended keywords to the user as shown in FIG. 8. The user can delete or correct an unnecessary key word among the produced key words. As a possible modification of this processing, in generating the key word group from the user-specified key word, the key word thesaurus may be displayed as a list form, a tree-structured form or a network form, so that the user can select or add the necessary data, or delete the unnecessary data from the display.

A contents condition as a search condition is determined by describing conditions about the contents of information as a search object. Generally, the determination of contents conditions is performed by subjecting a conditional sentence written in a natural language to the analysis of form elements, syntactic analysis and meaning analysis, and converting the result of the analyses into a meaning matching template.

In the system of this embodiment, the contents condition is specified in a template form of

[concerning . . . ], for example.

Specifically, when the user inputs "analysis of sentence" as the expression of the contents, determination of contents conditions is performed in the unit for determining contents condition.

Figure 11:
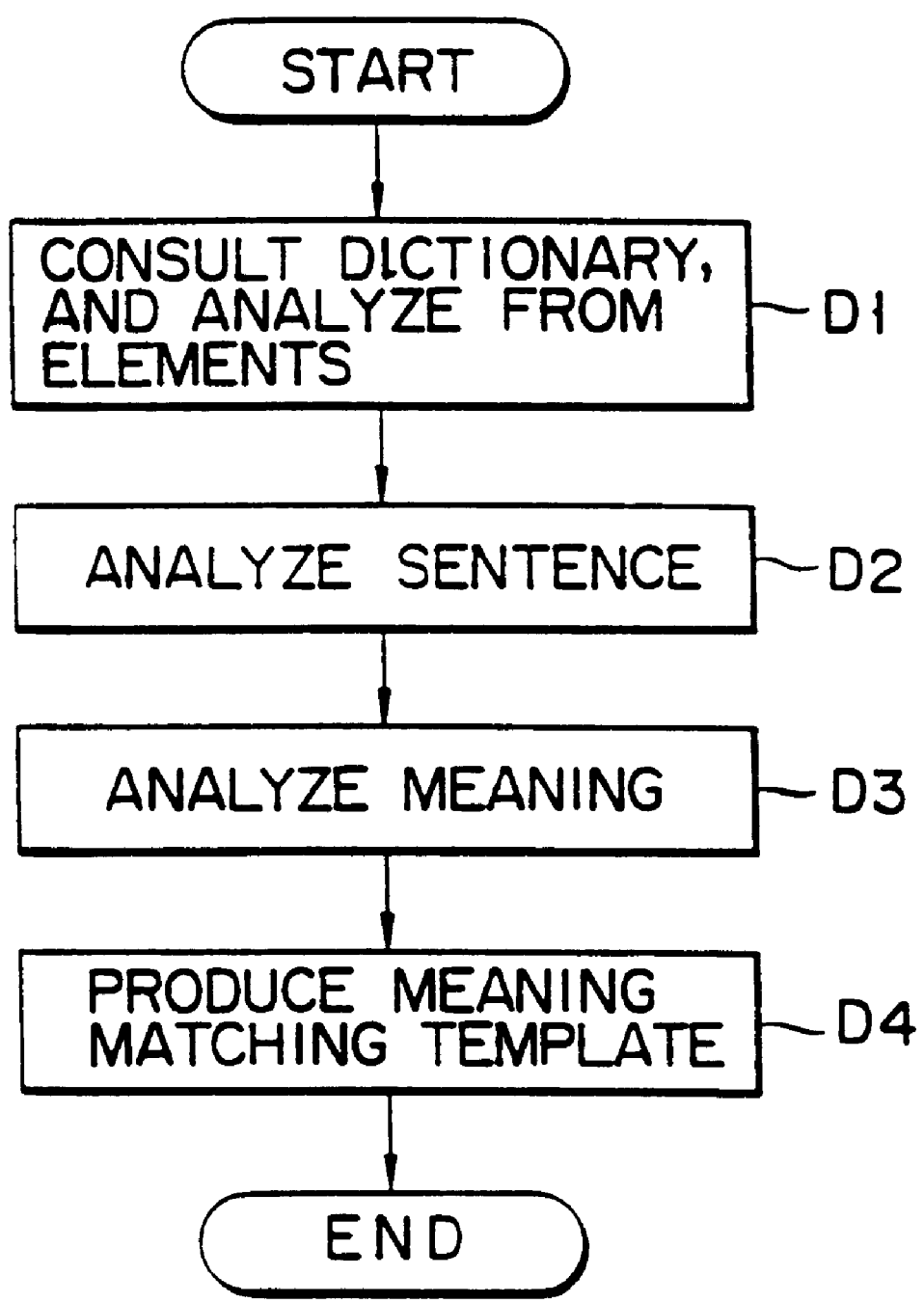
FIG. 11 is a flowchart showing how to describe the conditions of contents.

FIG. 11 exemplifies the process of determining contents conditions. When the user inputs "analysis of sentence", consulting a dictionary and analysis into form elements are performed with respect to the given expression of the contents (step D1). A machine dictionary and rules for form-element analysis used in this process are prestored in the data storage unit 3. After the dictionary-consulting and form-element analysis are completed by the usual method, a train of words, "analysis (verbal noun) of (preposition) sentence (noun)", is acquired according to the analysis structure shown in FIG. 12.

Based on the result of the analysis done in step D1, analysis of the sentence is executed using the syntax grammar stored in the data storage unit 3 (step D2). Under the rules of the syntax grammar, the input expression of the contents is determined as a noun phrase as a whole, which has a word, "analysis", linked to a word, "sentence", with a preposition, "of".

Figure 12:
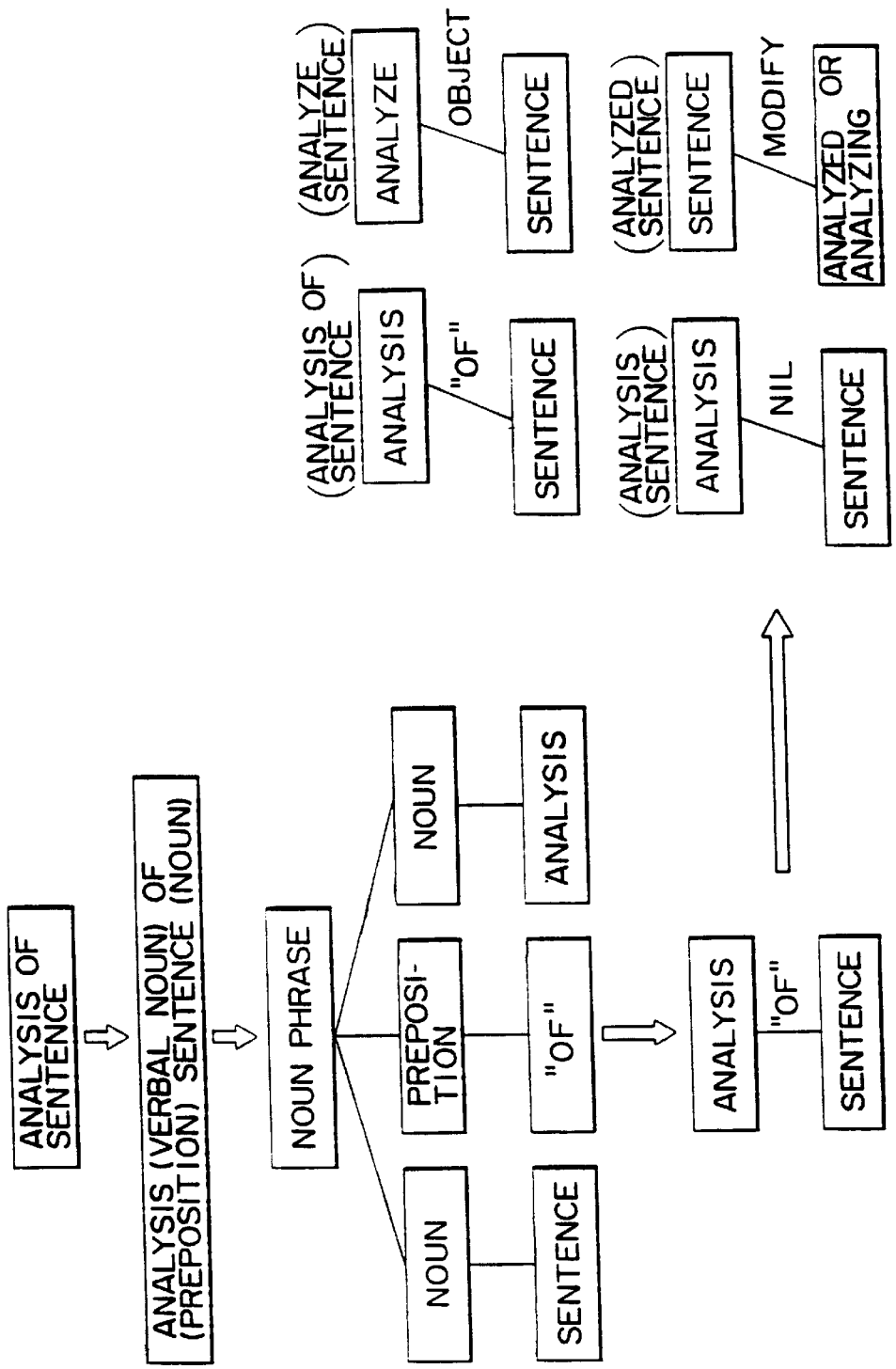
FIG. 12 is a diagram illustrating how data is transferred in processing the contents conditions.

In the meaning analysis process, it is apparent from the sentence structure acquired in step D2 that the word "analysis" is a main element of the sentence, and dominates the word "sentence" with a semantic relationship expressed by "of" (corresponding to a Japanese postpositional article "no") (step D3). According to the acquired meaning structure, meaning matching templates corresponding to the meaning structure, such as "sentence analysis", "analyze sentence", "analyzed sentence", and "analysis of sentence", are produced as shown in FIG. 12 in step D4. The preparation of matching templates in this manner permits meaning matching with another expression simply by, for example, the user's specifying the description of the contents about the search condition for "analysis of sentence".

It is also possible to produce matching templates to another expression, such as "recognition of sentence (analysis of phrase)", by incorporating a matching process for a synonym and associated words shown in FIGS. 9 and 10. When the process in FIG. 11 is executed, a key word and a contents condition are determined as user information in the search condition section b of the user information unit in FIG. 3, and the screen returns to the initial screen in FIG. 5. Based on the search condition the user has input, the user can change (update) or delete the meaning templates produced through the process in FIG. 11. In the extension of the content conditions in FIG. 8, an object to be matched with a meaning template corresponding to "analysis of sentence" is expressed in the form of a phrase. The user can pick up an expression appearing inadequate from the matching objects expressed in phrase form, and correct or delete it, for example.

Determination of proposition contents will now be explained.

When the user has selected [PROPOSITION CONTENTS] on the initial screen in FIG. 5, the determination of proposition contents is invoked in step B9 through the input determination processing (step B4) in FIG. 4. FIG. 13 shows an example of a screen for the determination of proposition contents to be proposed to the user when the determination processing is invoked. Various available information sources individually generate information having various formats. In the determination of proposition contents in FIG. 13, basically, information from the information sources is classified into ranks by the importance of the contents. More specifically, patent information provided from the patent database includes "title", "inventor", "belonging to; applicant", "claims", "description of the invention; specification", and "drawings", and it is determined in the process shown in FIG. 13 which information contents should be proposed to the user.

For example, on the screen for the determination of proposition contents in FIG. 13, the importance according to the contents of information is given by the user to the elements of the patent information as "title; title of the invention", "company; applicant" and "name; inventor" in the first rank, "summary" and "claims" in the second rank, "drawings" in the third rank, and "description of the invention; specification" in the fourth rank.

Figure 7:
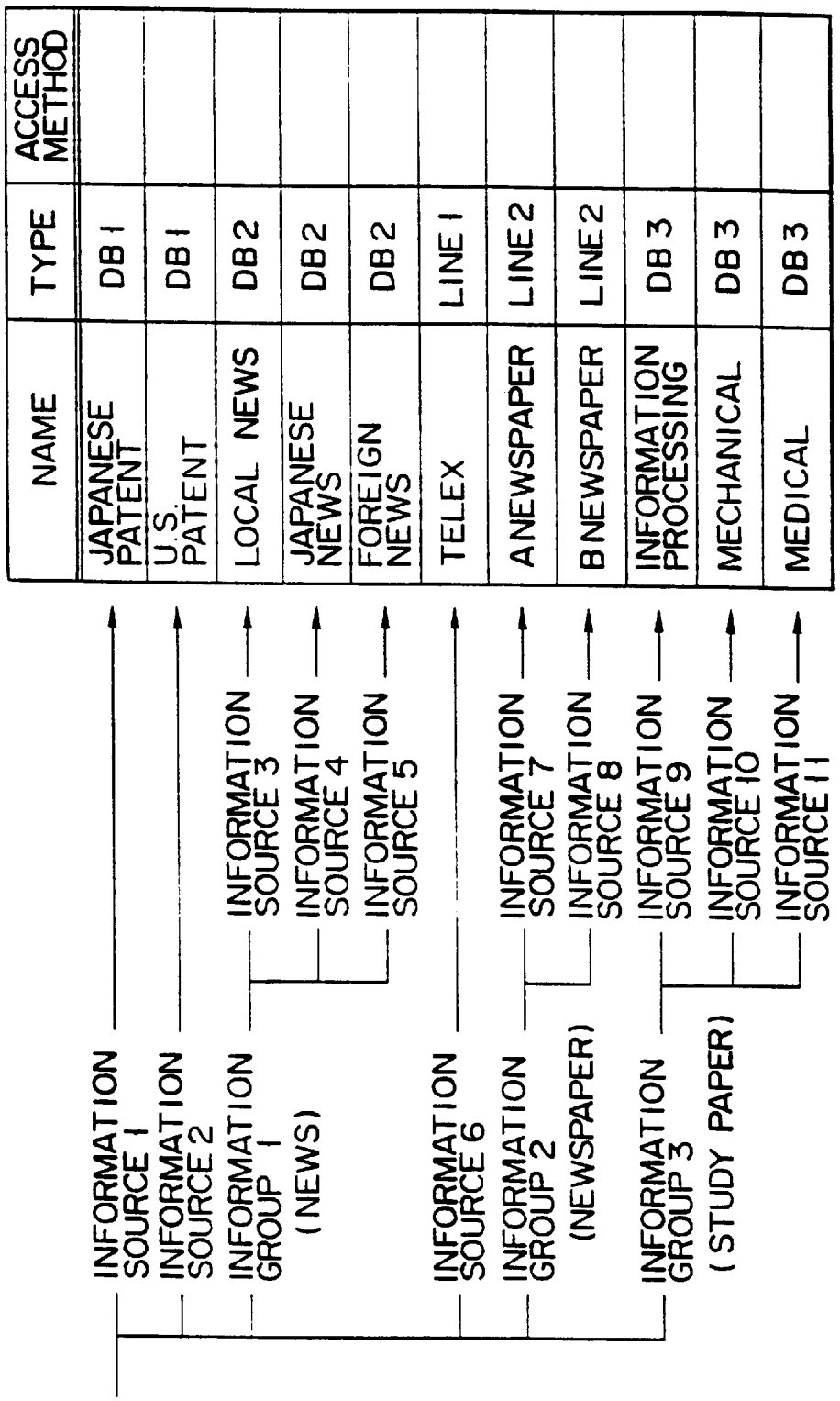
FIG. 7 is a diagram illustrating the data structure of information sources.

The contents and formats of information obtained from the information sources are determined by the types of the information sources in FIG. 7. It is therefore possible to propose information about the types of the information sources to the user in order to guide the determination of proposition contents. User information whose proposition contents are determined as described above is identified in the proposition content section c in the user information unit shown in FIG. 3.

When the user selects [DETERMINATION OF PROPOSITION METHOD], [DETERMINATION OF DATA PROCEEDING], or [DETERMINATION OF DATA MODIFICATION] on the initial screen in FIG. 5, that selection is detected in the input determination process in step B5 in FIG. 4. The [DETERMINATION] of proposition method, etc. is then invoked (step B10). FIG. 14 exemplifies a display screen in the case where any of the mentioned determination processes are executed. The user interactively determines four items, [PERIOD], [PROPOSITION METHOD], [ERASE TIMING], and [DATA MODIFICATION], through the screen in FIG. 14.

The item [PERIOD] defines when desired information source should be proposed if the desired information is obtained through the above process. If "Monday, 10:00" has been selected, as shown in FIG. 14, data which specifies that collected information will be proposed to the user at ten o'clock every Monday is stored in the data storage unit 3.

To access an external database, the timing for accessing external database has only to be selected in the same manner. In the example shown in FIG. 14, the database is set to be accessed at nine o'clock every Monday.

The item [PROPOSITION METHOD] specifies means (proposition form) for providing information for the user. In the example in FIG. 14, that means is specified so that information proposition is performed using an electric mail [EMAIL]. It is also possible to specify a report name defined by the user to propose a collection of information acquired from several user information units. For example, if [EMAIL-WEEKLY] is specified to the [PROPOSITION METHOD], multiple pieces of information are packed in one mail before proposition to the user.

[ERASE TIMING] is an item for specifying the timing for erasing data which has been fetched from an external unit and stored in the data storage unit. In FIG. 14, since information "one week after proposition" is set in the system, information which has been proposed to the user will be erased one week later.

[DATA MODIFICATION] is user information for specifying the format of processing to be added to information obtainable from the external database. The user information is determined, for example, as "translation to English, output to paper" as shown in FIG. 14. In that case, collected information is translated into English, and the translated information is then printed on given paper. The user information to be determined as shown in FIG. 14 is stored in the individual items of the proposition method d, data proceeding e and data modification f. Through this step, the identification process in the user model determination unit 4 is completed.

The user model edit processing A5 in FIG. 2, which is for performing changing, addition and erasing on various data identified in the user model determination unit 4, is basically executed in the same manner as the identification processing.

Figure 15A:
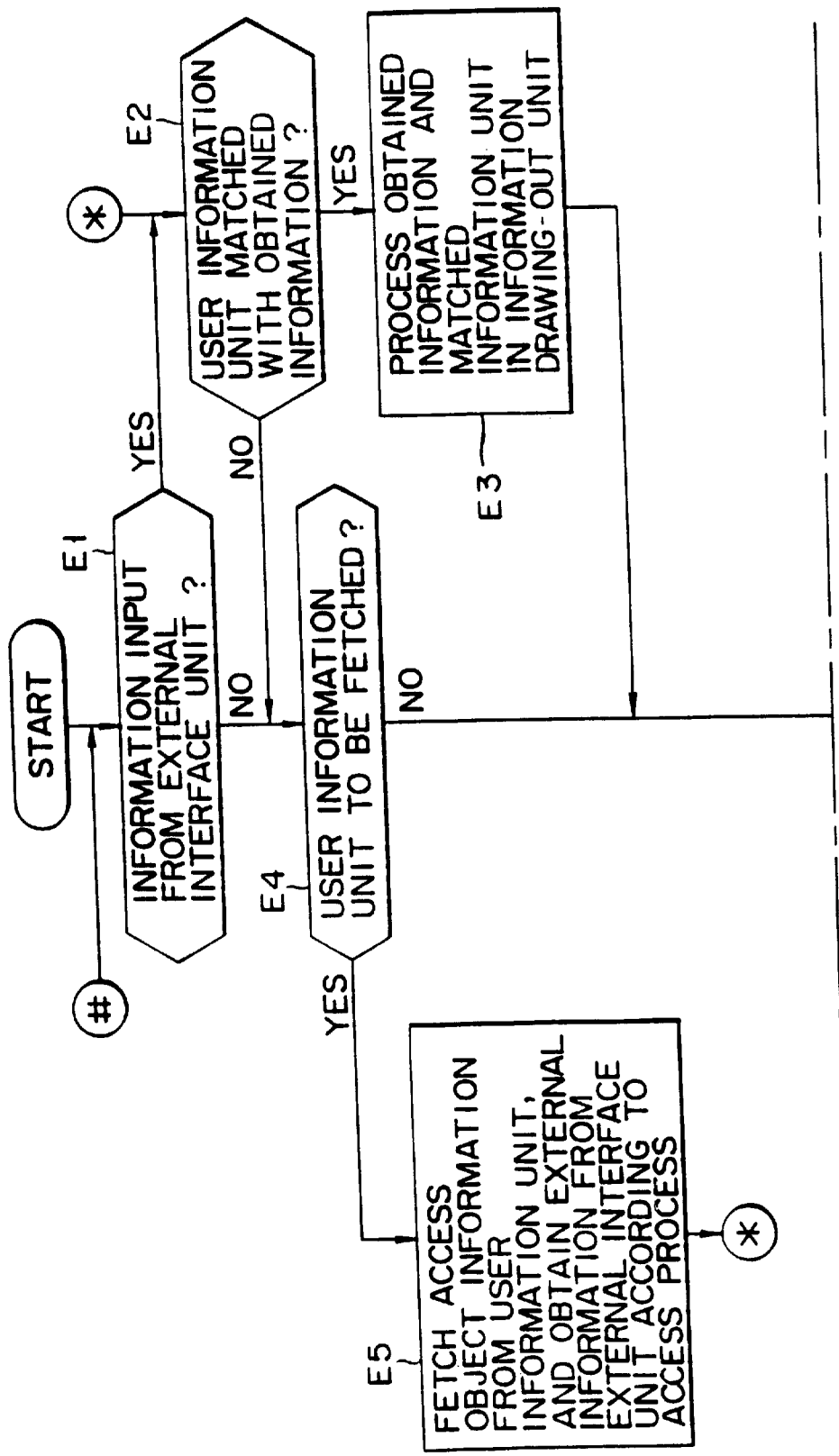
FIGS. 15A and 15B are flowcharts representing the processing of a control unit.
Figure 15B:
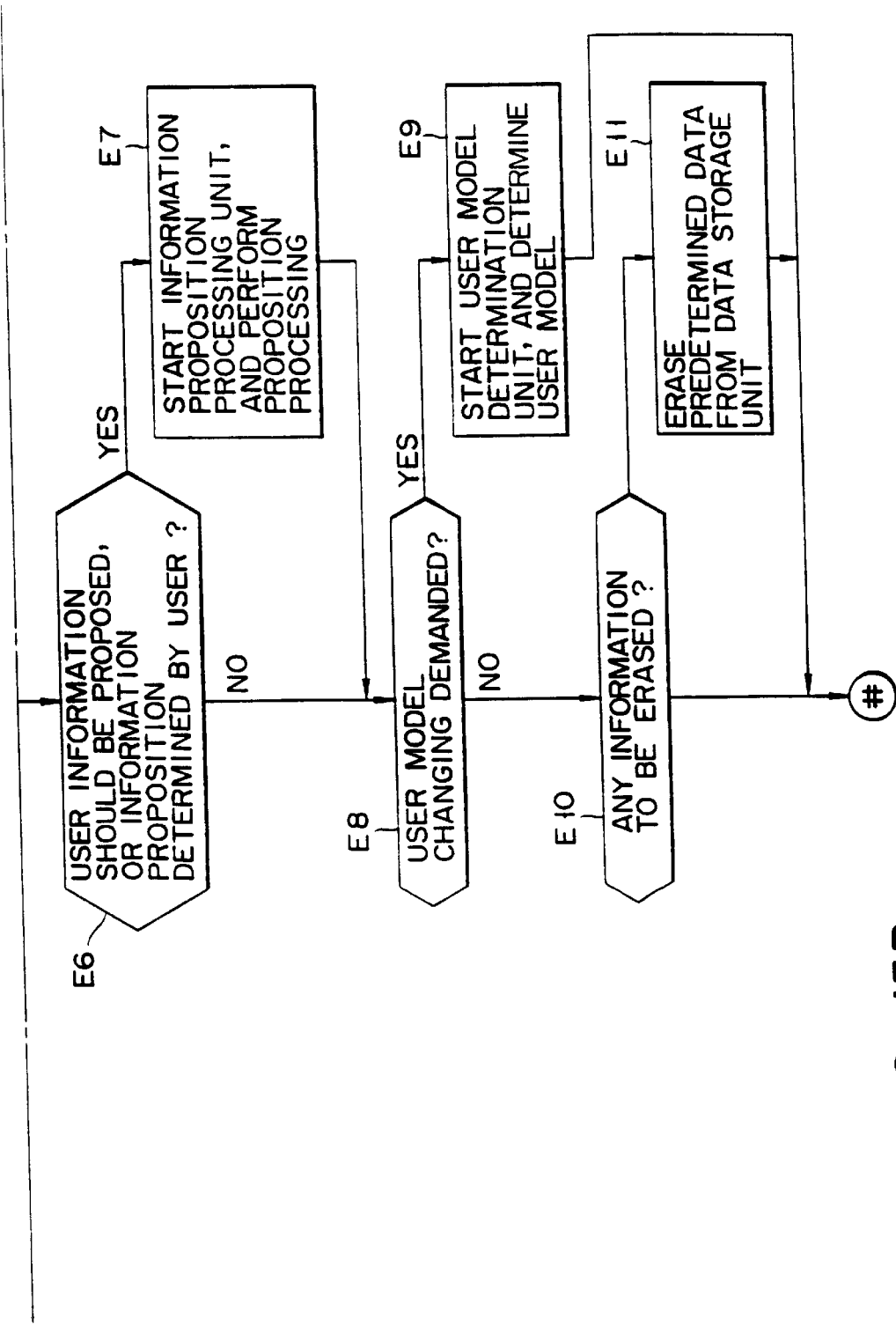

The control unit 7 which performs the general control of the system according to this embodiment basically operates in accordance with the routine shown in FIGS. 15A and 15B.

First, the control unit 7 determines whether or not any information has been input through the external interface unit 2 (step E1). When there is external information, the control unit 7 checks if there is a user information unit which has the source of the input information determined as a search object (step E2). If such a user information unit exists, the externally-input data area and the user information unit having the source of the externally-input information as the search object are sent to the information drawing-out unit 5 where an information drawing-out process is executed (step E3). When there is no information input from the external interface unit 2 or no user information unit exists from information source of external input information as a search object, the control unit 7 searches the user information units already identified, and checks if there is an information source accessible to an external database at the time of the searching (step E4). If there is an accessible information source, data to be accessed is fetched from the user information unit, and information accessing is performed through the external interface unit 2 in accordance with the accessing process stored in the data storage unit 3 to thereby acquire external information (step E5). When external information is input through steps E4 and E5, the processing starting with step E2 will be executed.

If there is no accessible information source at the time the determination is made in step E4, it is then determined whether or not there is a user information unit which should be proposed to the user (step E6). If such a user information unit exists, the control unit 7 activates the information proposition processing unit 6 to execute information proposition processing (step E7).

If there is no user information unit to be proposed to the user, or if there is no information proposition request from the user, the control unit 7 determines whether or not the user has made a user model determining or changing request (step E8). If there is a user model determining or changing request, the control unit 7 activates the user model determination unit 4 to perform the aforementioned user model determination (step E9).

Further, the control unit 7 searches the user information unit to determine if there presently exists information that should be erased (step E10). If such information to be erased exists, that information is erased from the data storage unit 3 (step E11).

The processing of the information drawing-out unit 5 will now be described.

The information drawing-out unit 5 basically checks if information input through the external interface unit 2 matches with various predetermined conditions stored in the user information unit. When the input information matches with the conditions, it is stored and held in the data storage unit 3. Specifically, the information drawing-out unit 5 has a function to filter input information at a high speed and a function to analyze and determine the input information in more detail.

Figure 16:
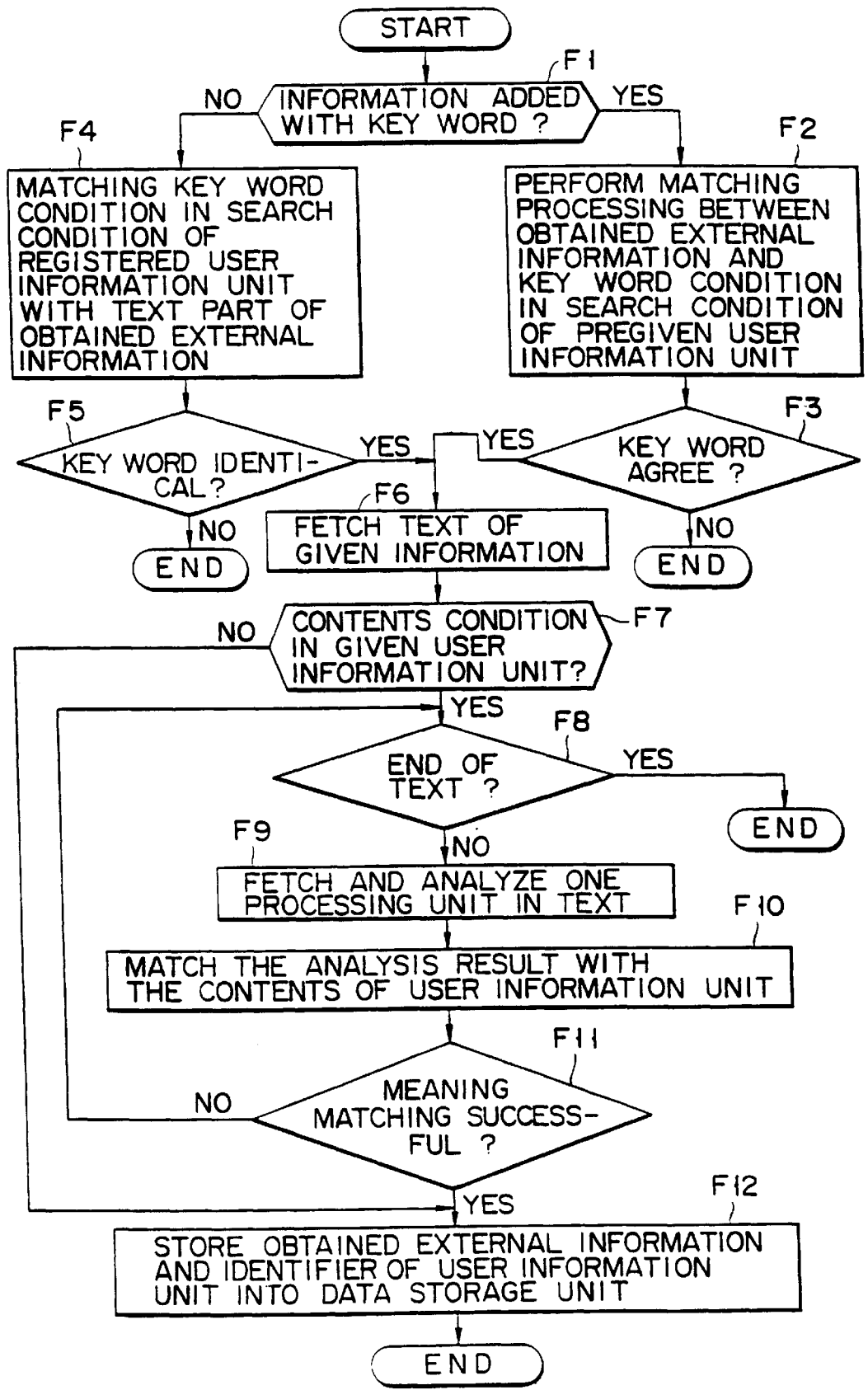
FIG. 16 is a flowchart representing the processing of an information drawing-out unit.

FIG. 16 illustrates the flow of the operation done by the information drawing-out unit 5.

The information drawing-out unit 5 refers to the type of the information source of information to be a search object, and determines whether or not a key word is added to the information given from the information source (step F1).

If key word information is affixed to the given information, a key word group acquirable from the given information is subjected to matching with a key word condition in the search conditions in the determined user information unit (step F2). The matching process in step F2 is realized by determination of a logical operation. When the matching with the key word fails in step F2, it is determined that the input information is not what is desired by the user, and the matching process will be terminated (step F3).

When no key word is affixed to the input information (step F1), a matching process between individual words constituting a text portion in the given input information and the key word condition indicated by the search conditions in the user information unit is executed over the entire text (step F4). When the matching with the key word fails in step F4, it is determined that the input information is not what desired by the user, and the key word matching process will be terminated (step F5).

When the key word matching is successful in step F2 or F4, it is determined that the input information is what the user wants, and the text portion in the input information which has resulted successful in the matching process is drawn out (step F6). Thereafter, texts are drawn out one by one from the drawn-out text portion and the contents of each drawn-out text are checked.

Then, it is determined if a contents condition is specified in the search conditions in the user information unit (step F7). When the contents condition of the search condition in the user information unit is specified, it is determined if the processing has progressed to the end of the text portion (step F8). If the processing has progressed to the end of the text portion in step F8, the processing will be terminated. Otherwise, one text is drawn out from the text portion of the input information, and this text is subjected to a form-element analysis, syntactic analysis and meaning analysis to acquire the semantic structure of the drawn-out text (step F9).

Then, the text's semantic structure resulting from the analyzing process is subjected to meaning matching with the contents condition indicated by the user information unit (step F1). Then, the result of the matching in step F10 is determined (step F11). When the meaning matching is successful in step F11, the input information is determined as the one the user wants. An identifier of the user information unit is affixed to the determined information, and the resultant information is stored in the data storage unit 3 (step F12).

Through the above procedures, only the information matching with the user information unit can be accumulated in the data storage unit 3 and can be collected.

The meaning matching process will now be described, giving a specific example.

Assume that a meaning matching template as shown in FIG. 12 is stored in the contents condition section in the user information unit. When a sentence

[This system analyzes simple sentences.] is included in the text in the input information which is to be subjected to the matching process, the result of the analysis of the semantic structure for this sentence would be as shown in FIG. 17.

When each portion of this semantic structure is subjected to template matching for the aforementioned meaning matching template, matching succeeds at the portion

[analyze-object-sentence].

Because of the successful matching process, in this example, it is determined that the user-specified condition "analysis of sentence" has the same meaning as a text "analyze sentence".

The operation of the information proposition processing unit 6 will now be described.

The information proposition processing unit 6 is invoked when the control unit 7 determines in step E6 in FIG. 15B that there is a user information unit to be exist in this step, or when the user requests informational proposition.

Figure 18B:
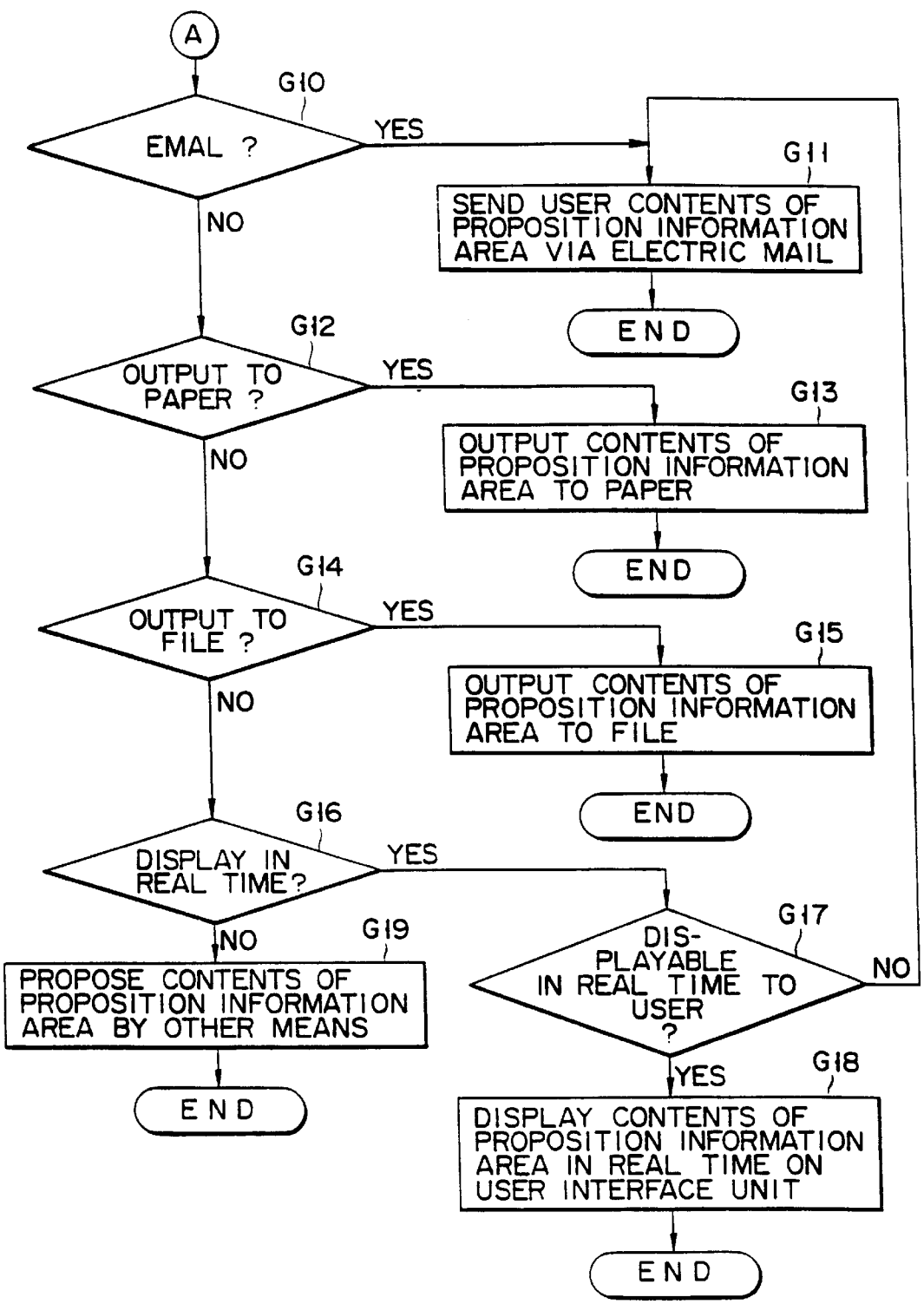

FIGS. 18A and 18B exemplify the sequence of processes of the information proposition processing unit 6. When the information proposition processing unit 6 is invoked, multiple pieces of information stored by the information drawing-out unit 5 are stored in the data storage unit 3 together with identifiers of the corresponding user information units and information concerning a data-collecting period. The information proposition processing unit 6 first draws out all information which is currently a proposition object from the information in the data storage unit 3, and determines a proposition information area for preparing information to be proposed to the user (step G1).

The input information and the user information unit are stored in the data storage unit 3 as shown in FIG. 19, for example. Referring to FIG. 19, x is the identifier of the user information unit, y is information determined through the external interface unit 2 by the information drawing-out unit 5, z is information of the time at which the system has collected information, and w is pointer information (capable of storing more than one piece of information) for information which is fetched from the user information unit based on that user information unit. [WEEK-EMAIL] and [MONTH-EMAIL] are used as a method for proposing information in the user information unit x.

The user information relating to the above proposition method is a title for proposing multiple pieces of information as one, and is linked as information represented individually in FIGS. 20A and 20B. It is determined in the example in FIG. 20A that the proposition timing of [WEEK-EMAIL] is "ten o'clock every Monday", the total amount of information to be proposed is "two A4-size pages of information", and the proposition method is "propose to USER 1 by electric mail".

In the process in step G1 in FIG. 18A, referring to the information, the information proposition processing unit 6 links information to be proposed, and draws it out. As a result, "information 1" and "information 3", both stored in the user information units having [WEEK-EMAIL] as the proposition method, will be set as proposition objects in the proposition information area on Monday, at ten o'clock. After setting the information in the proposition information area, information about the proposition method is read out from the data storage unit 3 (step G2). Through the process in step G2, with regard to the [WEEK-EMIL], user information to the effect that the total amount of information is two A4-size pages of information and the information is to be proposed to the USER1 by electric mail will be fetched out.

In the case of user information which, unlike the mentioned (WEEK-EMAIL), does not exist over multiple user information units, proposition information specified by an individual user information unit is fetched out.

In step G1, pointer information referring to FIG. 19 to information present in the data storage unit 3 is set in the proposition information area, so that information (unsummarized, etc.) accumulated in the data storage unit 3 can be referred to using the pointer information.

After information is read out from the data storage unit 3 in the above manner, it is determined if the total amount of information set in the proposition information area exceeds the amount of information specified by the user (step G3). When the amount of information set in the proposition information area exceeds the user-specified amount of information, information in proposition contents areas of the user information units for the respective information are checked and it is then determined whether or not information of a lower rank to the information set in the proposition information area can be erased (step G4).

When erasing the information of a lower rank is determined to be possible in step G4, this information is erased from the proposition information area to reduce the total amount of information in the proposition information area (step G5). Thereafter, the sequence of processes starting with step G3 will be repeatedly executed. When it is not possible to erase information of a lower rank, it is checked if the information in the proposition information area has already been summarized (step G6). If a summarizing process has not been performed yet, summarization of that information is done to reduce the information in the proposition information area (step G7), before the process sequence from step G3 is repeated.

The summarization will be briefly explained below. The process of summarizing information progresses in accordance with the process flow is shown in FIG. 21, for example. This summarization starts with the extraction of one piece of information from the proposition information area (step H1). Then, it is determined whether or not summary information is affixed to the extracted information (step H2).

The determination process is carried out by searching for a key word, such as "summary", "abstract" or "first" and drawing out the text portion from the searched key word to the next chapter or next passage or paragraph. In this process, when it is determined that summary information is affixed to the information to be proposed, text information excluding the summary portion in the information is erased, and the remaining portion is set in the proposition information area (step H3). When the drawn-out information has not been determined as having summary information affixed thereto, it is then determined whether or not that information has "title", "chapter head", or the like (step H4). Generally, in step H4, a chapter head has a structure of "numeral+a train of characters", such as "1. Process flow". Therefore, it is possible to determine and detect a chapter head by drawing out a pattern of characters, such as the aforementioned chapter head. When a sentence having "title", "chapter head" or the like is detected and determined, text information other than the "title" or "chapter head" in that sentence is erased, and the remaining information is set in the proposition information area before the process is terminated (step H5).

When "title", "chapter head" or the like is not detected, a middle portion excluding the first and last portions of the information is replaced with an ellipsis " . . . " and the amount of information the ellipsis " . . . " replaces is set as deleted information in the proposition information area (step H6). The first portion and last portion determined in step H6 may be determined as the first and last paragraphs in the text information, or a given number of characters respectively from the first and last characters in the text information. Further, which portion to extract may be changed in accordance with the amount of information. The summarization of information is executed through the above-described processing to reduce the amount of information in the proposition information area, so that the total amount of information can fall within the desired range.

When the total amount of information in the proposition information area falls within the user-specified limit, or when it is not possible to reduce the information further, it is determined whether or not the user information unit designates data modifications to that information (step G8). When information about a data modification is identified in the user information unit by the user, the designated data modification is performed (step G9). For instance, when data modification, "translation into English", is specified, a Japanese sentence is machine-translated into English, and the result of the translation is set in the proposition information area. Then, it is determined whether or not [EMAIL] is specified as an information proposition method (step G10). When [EMAIL] is specified, the contents of information in the proposition information area are transmitted via electric mail to the specified user, and the proposition process is terminated (step G11). When [EMAIL] is not specified, it is determined if the specified proposition method is "output to paper" (step G12). When "output to paper" is specified, the contents of the proposition information area are output on an output unit, such as an LBP, via the user interface unit 1 to propose it to the user (step G13).

It is also determined in step G14 if the specified proposition method is "output to file". When "output to file" is specified, the contents of the proposition information area are output to a specified file (step G15). It is also determined in step G16 if the specified proposition method is "display in real time". When "display in real time" is specified, it is checked if the real-time display of the information to the user is possible (step G17).

The determination of the possibility of the realtime display in step G17 is performed by checking if the user is using a computer system at the time of information proposition. If such real-time display is possible, the contents of the proposition information area are proposed through the user interface unit 1 using the screen the user is using (step G18).

When none of the proposition methods mentioned above is specified, information in the proposition information area is proposed to the user utilizing other proposing means (step G19).

A specific example of using the information collection system having the above structure will be described below.

Consider that the case where two user information units as shown in FIGS. 22A and 22B, for example, using the user model determination unit 4 are determined.

In the user information unit #1 in FIG. 22A, "Japanese patent database" is specified as a search object, while the same search condition as shown in FIG. 8 is specified for the search object. Proposition contents are specified with "title", "company" and "name" as the highest rank, "summary" as the second rank, and "text" as the third rank. [WEEK-EMAIL] is specified as the proposition method. The proposition method is specified in this example as the one shown in FIG. 20, namely "timing: Monday 10 o'clock, total amount: two pages in A4 size, method: EMAIL TO USER1".

The user information unit #2 in FIG. 22B specifies "telex" line as a search object and "public works" as a key word that is a search condition. Further, [WEEK-EMAIL] is specified as the proposition method for the user information unit #2 as in the case of the user information unit #1.

When the user information unit #1 or #2 is identified in the data storage unit 3 of the system according to this embodiment, the control unit 7 starts information collection through the external interface unit 2. At the beginning of the information collection, the control unit 7 detects that the reporting timing (timing for information proposition) for [WEEK-EMAIL] is 10 o'clock on Monday, and finds out that the type of the "Japanese patent database" as the search object of the user information unit #1 is "database" referring to the table shown in FIG. 7. The control unit 7 therefore accesses the "Japanese patent database" at 10 o'clock on Monday. Through the data access, patent data which has been registered in the "Japanese patent database" since the last Monday, 10 o'clock will be drawn out.

When patent data as shown in FIG. 23 is acquired by the above data access, the control unit 7 sends the acquired patent data to the information drawing-out unit 5. Based on the search condition indicated in the user information unit #1, the information drawing-out unit 5 determines if matching with information data is needed. In this example, for patent A, a key word condition "voice recognition & sentence analysis" is matched with the determined user information unit, and the text portion "syntactic analyzing process" (object) present in the text is semantically matched with the contents condition of the user information unit #1, "analysis of sentence". As a result, patent A is determined as information which is matched with the user's request in accordance with the search condition of the user information unit #1, and it is stored together with the identifier to the user information unit #1 into the data storage unit 3.

With regard to patent B, patent data, shown in FIG. 23, likewise, the "key word condition" is matched with the "contents condition", so that the information of patent B is stored together with the identifier to the user information unit #1 into the data storage unit 3.

Since patent C shown in FIG. 23 does not match with the "key word condition", it will be excluded from what should be stored in the data storage unit 3. That is, the information of patent C is not stored in the data storage unit 3. In the above manner, of patents A, B and C obtainable from the "Japanese patent database", only the first two, patents A and B, are stored in the data storage unit 3 as information to be proposed to the user.

Information collection for the user information unit #2 will be executed as follows. When a telex as shown in FIG. 24 is sent over a telex line, for example, the control unit 7 detects information input through the external interface unit 2 and activates the information drawing-out unit 5 in accordance with the process in step E1 shown in FIG. 15A. When the input information is telex information, a key word is not added to the telex information itself. Matching between a word in the telex text and a key word "public works" is performed.

Since the text in a telex A in FIG. 24 includes a text portion saying "the budget for the public works was increased", the key word condition indicated by the user information unit #2 is fulfilled. As no particular contents condition is specified in the user information unit #2, however, the telex A is directly determined as information the user wants. As a result, the information of the telex A is stored together with the identifier of the user information unit #2 into the data storage unit 3.

Since a telex B shown in FIG. 24 does not contain the words "public works", it fails to fulfill the key word condition. The telex B is not therefore stored in the data storage unit 3.

In the above state for information collection, the control unit 7 activates the information proposition processing unit 6 to perform the proposition of [WEEK-EMAIL].

FIG. 25 illustrates an example of proposition information prepared by the information proposition processing unit 6. The proposition information shown in FIG. 25 is information acquired from the "Japanese patent database" as information about an information source. Although there are five items, "title", "company", "name", "summary" and "text", specified as the proposition contents of the user information unit #1, the total amount of all the information in the "Japanese patent database" exceeds the total amount specified by the aforementioned [WEEK-EMAIL]. FIG. 25 therefore illustrates the information as proposed with information of "text" of a lower rank eliminated by the information proposition processing unit 6. Information corresponding to the user information unit #2 is proposed in such a way that the middle portion of the telex information text is omitted and the resultant information is incorporated into the aforementioned database information.

In FIG. 25, "%105", "%109" and "%15" are pointers to the original information stored in the lower concept in step G1 in FIG. 18A. These pointers permit access to the original information stored in the lower concept. Accordingly, the user can request proposition of the original information using such a pointer as a key. With the use of a hyper media, the pointers for data access can be realized as pointers on the proposition screen, in which case the user can easily access the original information by clicking the desired button on the proposition screen.

According to the information collection system embodying the present invention, it is possible to automatically collect information specified by a user, and propose the information at the user-desired timing in the user-desired form. This produces practically significant effects, such as the desired information being collectible accurately and in a surely arranged form without overlooking information collection.

The present invention is not limited to the above-described embodiment. For instance, while the system according to this embodiment has been described referring to the case where access to database data input from a telex line are performed, this invention may be applied to an access to various information sources, such as another network news, a personal computer communication, and a computer electric mail.

While data to be handled in the system of this embodiment has been described as character data, this system may be applied to various forms of information, such as a chart or diagram, a picture image, a speech, numeral data, in accordance with how to output data of that information source. With regard to proposition of information to a user, it is not limited to electric mail or real-time display on a screen, but a computer-controllable communication media, such as access to the user through a telephone, may be properly used as needed.

Although the data modifying process is exemplified as translation of information in the system of this embodiment, various other operations are also possible, such as acquisition of a history about information or statistic information, automatically outputting a command to the outside of the system and sending information via electric mail to other users. While the summarization is performed on all the information to reduce the amount of information, it is possible to take some measures to further greatly reduce the amount of data whose validness drops with the passage of time. The present invention may be modified in various other ways within the scope and spirit of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information collection system connected to a communication network for receiving a plurality of information including electronic mail and for collecting desired information from said communication network, comprising:

user interface means for executing input/output information with respect to a user;

external interface means for exchanging various types of information with a plurality of external units connected to said communication network;

user model determination means for preparing first user-information for discriminating and modifying information required by said user, and second user-information for defining an information proposition method in a form of a user-desired format;

information drawing-out means for drawing out information input from said external interface means in accordance with said first user-information;

information modify means for modifying the drawn out information into a user-desired information by performing desired processing in accordance with the first user-information;

information proposition processing means for converting information modified by said information modify means into a proposition form for said user in accordance with said second user-information;

output means for outputting information converted by said information proposition processing means; and control means for receiving information from said individual means mentioned above, and executing control of said individual means and information exchange therewith in accordance with said received information.

2. An information collection system according to claim 1, wherein said user model determination means prepares said first and second user-information as a user information unit, and said user information unit includes:

a search object item for specifying a destination for information collection;

a search condition item for discriminating said user-desired information from unnecessary information;

a proposition content item for proposing only said user-desired information among acquired external information;

a proposition method item for proposing said external information at a user-desired timing and in a form of user-desired contents; and a data proceeding determination item for defining a save form and an erase timing of said external information.

3. An information collection system according to claim 2, wherein said search condition item includes:

a key word input through said user interface means by a user; and a logical key-word representation generated from said key word.

4. An information collection system according to claim 1, wherein said user model determination means includes importance determination means that a user determines an importance rank for collected information.

5. An information collection system according to claim 4, wherein said information drawing-out means includes:

a function to filter input external information at a high speed; and a function to analyze and determine said external information in more detail.

6. An information collection system according to claim 1, wherein said information proposition processing means includes a function to integrate multiple pieces of information acquired through said external interface means respectively from said plurality of external units and converting the integrated information into the proposing form for the user.

7. An information collection system according to claim 1, wherein said information proposition processing means includes a function to change a proposition method for information acquired through said external interface means and a proposing amount of said information in accordance with one of an elapsing time from an input time of said information and an amount of information drawn out by said information drawing-out means and modified by said information modify means.

8. An information collection system according to claim 1, wherein said control means includes means for accessing an external database via said external interface means in accordance with said first user-information proposed by said user model determination means.

9. An information collection system according to claim 1, wherein said control means includes a function to propose and output said information converted by said information proposition processing means through said user interface means at a timing determined in accordance with said first user-information prepared by said user model determination means.

10. An information collection system according to claim 1, further comprising data storage means for storing said first and second user-information and external information.

11. An information collection system connected to a communication network for receiving a plurality of information including electronic mail and for collecting desired information from said communication network, comprising:

user interface means for executing input/output information with respect to a user;

external interface means for exchanging various types of information with a plurality of external units connected to said communication network;

user model determination means for preparing first user-information for discriminating and modifying information required by said user, and second user-information for defining an information proposition method in a form of a user-desired format;

information drawing-out means for drawing out information input from said external interface means in accordance with said first user-information;

information modify means for modifying the drawn out information into a user-desired information by performing desired processing in accordance with the first user-information;

information proposition processing means for converting information modified by said information modify means into a proposition form for said user in accordance with said second user-information; and output means for outputting information converted by said information proposition processing means.

12. An information collection system according to claim 11, wherein said information proposition processing means includes a function to integrate multiple pieces of information acquired through said external interface means respectively from said plurality of external units and converting the integrated information into the proposing form for the user.

13. An information collection system according to claim 11, wherein said information proposition processing means includes a function to change a proposition method for information acquired through said external interface means and a proposing amount of said information in accordance with one of an elapsing time from an input time of said information and an amount of information drawn out and modified by said information drawing-out means.

14. An information collection system according to claim 11, further comprising data storage means for storing said first and second user-information and external information.

* * * * *